United States Patent
Rivlin et al.

(10) Patent No.: US 9,098,905 B2
(45) Date of Patent: Aug. 4, 2015

(54) SYSTEM AND METHOD FOR DETERMINING POSITION OF A DEVICE

(75) Inventors: Ehud Rivlin, Haifa (IL); Brian McClendon, Portola Valley, CA (US); Jean-Yves Bouguet, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 864 days.

(21) Appl. No.: 12/722,939

(22) Filed: Mar. 12, 2010

(65) Prior Publication Data

US 2015/0178565 A1 Jun. 25, 2015

(51) Int. Cl.
| | |
|---|---|
| *G06T 7/00* | (2006.01) |
| *G06K 9/46* | (2006.01) |
| *G06K 9/62* | (2006.01) |
| *G06K 19/06* | (2006.01) |

(52) U.S. Cl.
CPC ............... *G06T 7/004* (2013.01); *G06T 7/0042* (2013.01); *G06K 9/46* (2013.01); *G06K 9/4604* (2013.01); *G06K 9/4609* (2013.01); *G06K 9/6202* (2013.01); *G06K 2019/06243* (2013.01); *G06T 7/0065* (2013.01)

(58) Field of Classification Search
CPC ..... G06T 7/004; G06T 7/0042; G06T 7/0065; G06K 9/46; G06K 9/4604; G06K 2019/06243; G06K 2002/3225
USPC .......................................... 348/169, 116, 135
See application file for complete search history.

(56) References Cited

U.S. PATENT DOCUMENTS

| | | | | |
|---|---|---|---|---|
| 6,288,774 | B1 * | 9/2001 | Takubo et al. ................ 356/4.03 |
| 6,898,518 | B2 * | 5/2005 | Padmanabhan ................ 701/409 |
| 7,162,054 | B2 * | 1/2007 | Meisner et al. ................ 382/103 |
| 7,231,063 | B2 * | 6/2007 | Naimark et al. .............. 382/103 |
| 7,574,020 | B2 * | 8/2009 | Shamaie ........................ 382/103 |
| 7,634,336 | B2 * | 12/2009 | Chae et al. ........................ 701/28 |
| 7,969,413 | B2 * | 6/2011 | Aonuma et al. ............... 345/156 |
| 8,154,616 | B2 * | 4/2012 | Icho et al. .................... 348/222.1 |
| 8,411,086 | B2 * | 4/2013 | Rieffel et al. .................. 345/420 |
| 2006/0244830 | A1 * | 11/2006 | Davenport et al. ........... 348/148 |
| 2009/0312871 | A1 * | 12/2009 | Lee et al. ....................... 700/259 |
| 2009/0316951 | A1 * | 12/2009 | Soderstrom .................. 382/103 |
| 2010/0045816 | A1 * | 2/2010 | Rhoads ...................... 348/222.1 |
| 2010/0081921 | A1 * | 4/2010 | Urban et al. .................. 600/424 |

OTHER PUBLICATIONS

Patrick Luley, Alexander Almer, Christian Seifert, Gerald Fritz, and Lucas Paletta. "A Multi-Sensor System for Mobile Services with Vision Enhanced Object and Location Awareness." Proceedings of the 2005 IEEE International Workshop on Mobile Commerce and Services (WMCS'05). 2005. IEEE Computer Society.*
Lowe, David G., Distinctive Image Features from Scale-Invariant Keypoints, International Journal of Computer Vision, Jan. 5, 2004.

* cited by examiner

*Primary Examiner* — Behrooz Senfi
*Assistant Examiner* — Maria Vazquez Colon
(74) *Attorney, Agent, or Firm* — Lerner, David, Littenberg, Krumholz & Mentlik, LLP

(57) ABSTRACT

A system and method is provided for determining the location of a device based on image of objects captured by the device. In one aspect, an interior space includes a plurality of objects having discernable visual characteristics disposed throughout the space. The device captures an image containing one or more of the objects and identifies the portions of the image associated with the objects based on the visual characteristics. The visual appearance of the objects may also be used to determine the distance of the object to other objects or relative to a reference point. Based on the foregoing and the size and shape of the image portion occupied by the object, such as the height of an edge or its surface area, relative to another object or a reference, the device may calculate its location.

20 Claims, 27 Drawing Sheets

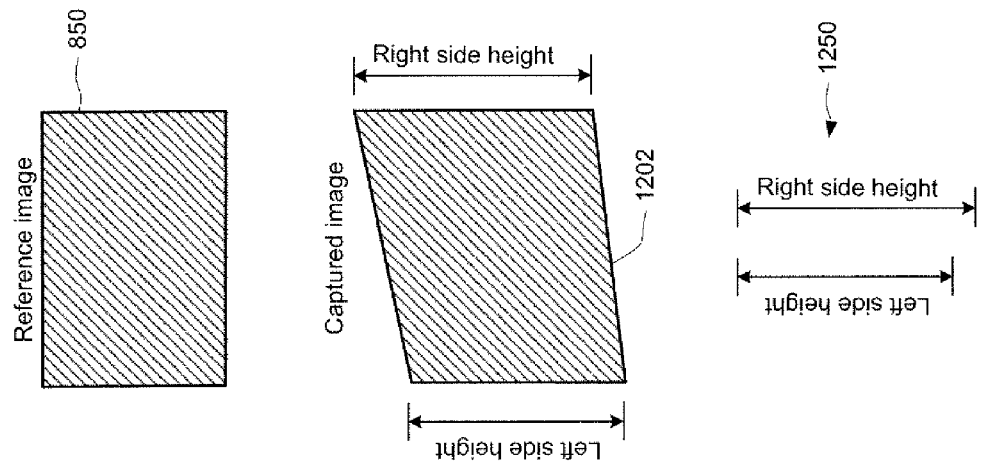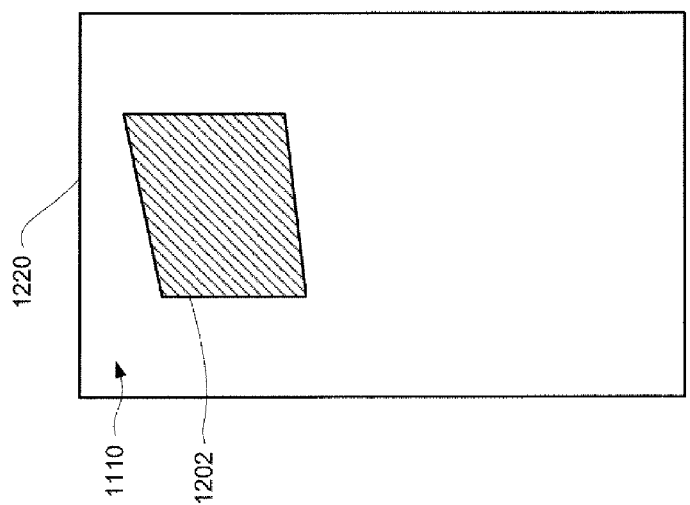
FIGURE 12

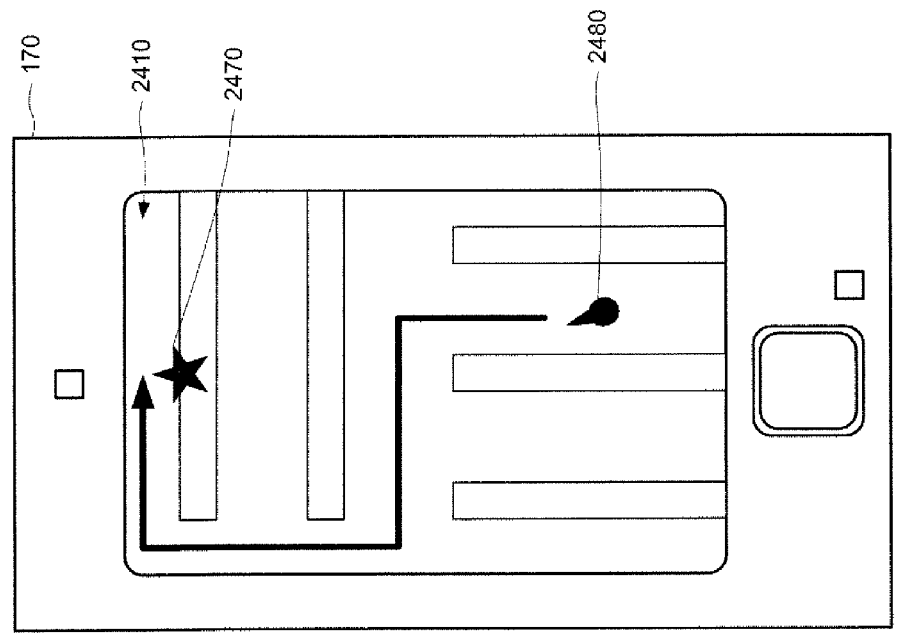
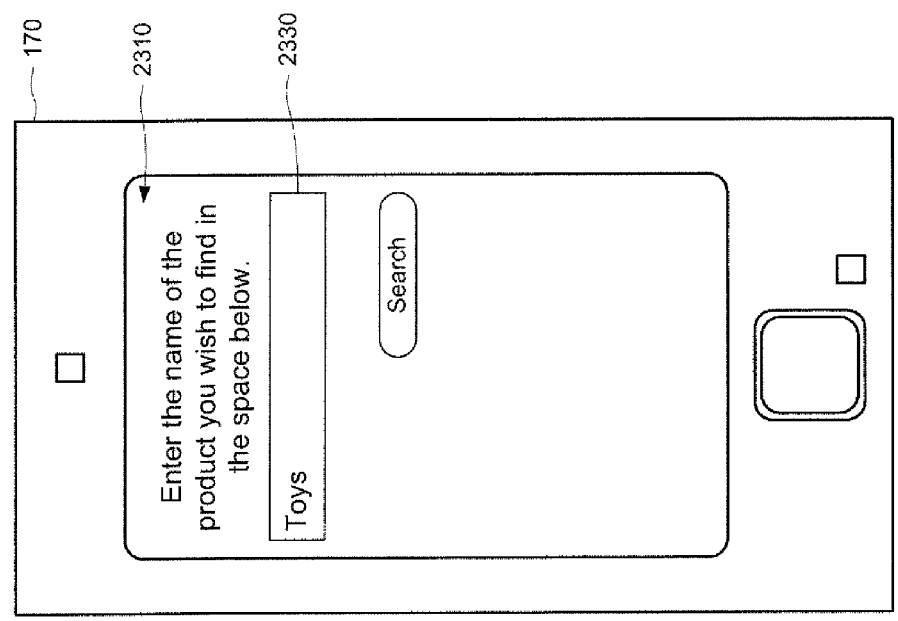
FIGURE 24
FIGURE 23

SYSTEM AND METHOD FOR DETERMINING POSITION OF A DEVICE

BACKGROUND

While GPS-enabled devices for navigation out of doors is common, GPS signals do not penetrate into interior spaces. Accordingly, other systems and methods are typically used.

For example, it is well known to use a laser range finder, echo locator or other devices that emit a signal, such as an electromagnetic or sound, by which distances to other objects in the room may be calculated.

Yet other systems comprise a gyroscope or similar inertial measurement device to determine the position of the object. Still another system relates to using a wheel attached to an odometer to measure distance. Both system types typically measure distance relative to a past point at which the object was located.

Systems existing for navigating toward a landmarks are also known. However, these systems typically require accurate knowledge of the three-dimensional position of the various landmarks and stable recognition of the landmark in the navigation process.

BRIEF SUMMARY

In one aspect, a method is provided that includes receiving an image captured by a camera and accessing a visual characteristic associated with an object. A processor determines whether the image captured an object at an object location by determining whether a portion of the image includes the visual characteristic. If so, the processor determines the portion of the image corresponding with the object based on the visual characteristic and further determines the camera's location relative to the object location based on a size associated with at least a portion of the object portion of the image. The method also displays on an electronic display, information based on the camera's location that was determined.

In another aspect, a system is provided that includes a camera, a plurality of objects disposed within an interior space, each object including visual indicia from which its reference location relative to a reference system may be determined, and a processor configured to receive an image from the camera, execute instructions and access data from a memory. The memory stores data identifying one or more visual characteristics associated with at least one of the objects. When more than one object is visible, greater accuracy and robustness may be achieved in many circumstances. The instructions include: receiving an image captured by the camera; determining whether the captured image includes images of at least one of the objects by determining whether the captured image contains one or more of the visual characteristics; determining the reference location of an object captured within the image based on the visual indicia of the object captured within the image and; determining the location of the camera with respect to a reference system based on the perspective deformation of the object as observed in the image. If more than one object is observed further refinement of the camera location may be achieved in many circumstances.

Another aspect provides a first and second set of visual beacons, where the surface area of each beacon within the second set is less than the surface area of the visual beacons in the first set. Each visual beacon is associated with an identifier, where the identifier for each beacon within a set is different than the identifier of another beacon within the set. The identifier is visually detectable from the surface of the beacon, and further identifies the location of the beacon relative to a reference location. The identifier also identifies the physical size or shape of the surface area of the beacon.

The foregoing aspect may also include computer-usable medium including a program that includes: computer code that determines whether an image captured by a camera includes an image of a visual beacon; computer code that determines the identifier of a visual beacon captured within the image; computer code that determines the location of the beacon relative to the reference location based on the identifier; computer code that determines the physical size or shape of the surface area of the beacon based on the identifier; computer code that determines the location of the camera based on the determined reference location, and based on a comparison of the determined physical size or shape with the size or shape of the image of the beacon within the captured image.

Yet another aspect provides a method of determining the location of a camera within an interior space. The method includes: receiving an image captured by a camera; identifying, with a processor, at least one object that is associated with a portion of the image within the space, where the portion is identified by comparing the visual characteristics of the portion with visual characteristics known to be associated with the object; identifying, based on visual information contained within the portion of the image displaying the object. The location of the camera relative to the object is determined by analyzing the geometric deformations of the object as observed on its image. To identify the location associated with this deformation, an optimization routine may be performed. The optimization routine may accept images of multiple objects to determine the location.

In still another aspect, a system is provided that includes a camera, an object disposed within an interior space, the object including two visual indicia from which its reference location relative to a reference system may be determined, and a processor configured to receive an image from the camera, execute instructions and access data from a memory. The memory stores data identifying the two visual characteristics associated with the object. The instructions include: receiving an image captured by the camera; determining whether the captured image includes images of the two visual indicia by determining whether the captured image contains one or more visual characteristics shared by the visual indicia; determining the reference location of an object captured within the image based on the visual indicia captured within the image and; determining the location of the camera with respect to a reference system based on the size of the portion of the image corresponding with one of the visual indicia relative to the size the portion of the image corresponding with another of the visual indicia, and further based on the reference location determined for the object.

BRIEF DESCRIPTION OF THE DRAWINGS

FIG. 12 illustrates the portion of an image occupied by a visual beacon relative to the bounds of the image captured from the second position and a reference image, in accordance with an aspect of the system and method.

FIG. 23 illustrates a search screen displayed by a client device in accordance with an aspect of the system and method.

FIG. 24 illustrates a suggested route displayed by a client device in accordance with an aspect of the system and method.

DETAILED DESCRIPTION

In one aspect, a user device (such as a mobile phone equipped with a camera) may determine its position (such as its location or orientation) within an interior of a building. To perform such determination, the building interior may include objects that are both visually discernable by the device and associated with locations within the building. By way of example, the objects may comprise checkerboard patterns that allow the device to determine the presence of the object and identify the item's location within the building. In other aspects, the prominent features of existing objects in the environment may be used as well.

When these objects are present in an image captured by the device, the device may estimate its own position based on the area of the image occupied by the item. For example, if the area (e.g., change in relative position of features on the object) is relatively large and centered within the image, the device may determine that is both close to and oriented towards the item. Similarly, when two such items are present in an image captured by the device, the relative shapes and sizes of the image areas they occupy may be used to estimate the device's location with greater accuracy. In many instances, the use of two such items may result in increased accuracy and robustness.

Figure 1:
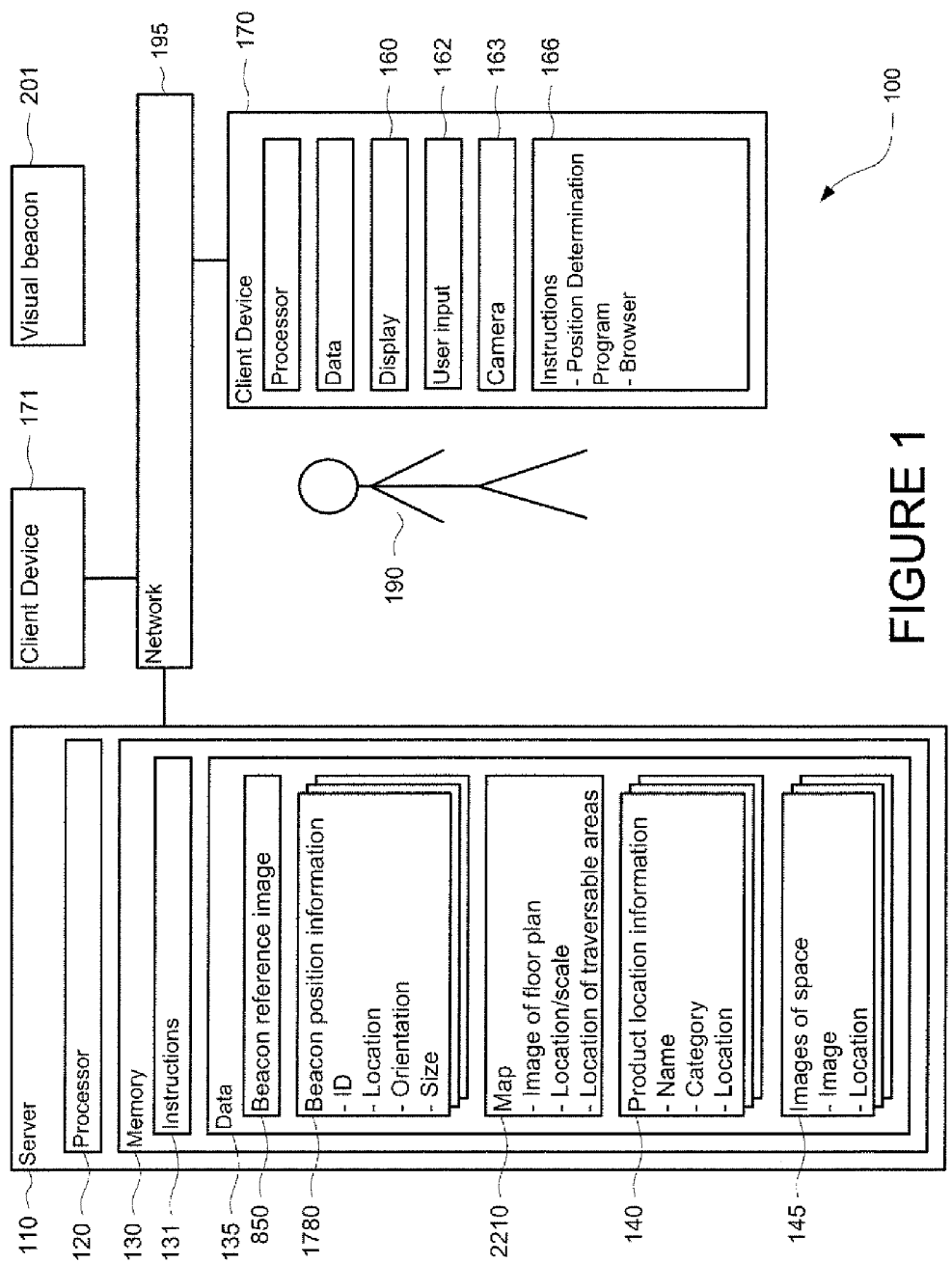
FIG. 1 is a functional diagram of a server, network, client device and visual beacon in accordance with an aspect of the system and method.

As shown in FIG. 1, a system 100 in accordance with one aspect of the invention includes a computer 110 containing a processor 120, memory 130 and other components typically present in general purpose computers.

Memory 130 stores information accessible by processor 120, including instructions 131 that may be executed by the processor 120 and data 135. The memory may be of any type capable of storing information accessible by the processor, including a computer-readable medium such as a hard-drive, memory card, ROM, RAM, DVD or other optical disks, as well as other write-capable and read-only memories. The system and method may include different combinations of the foregoing, whereby different portions of the instructions and data are stored on different types of media.

The instructions 131 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

Data 135 may be retrieved, stored or modified by processor 120 in accordance with the instructions 131. For instance, although the system and method is not limited by any particular data structure, the data may be stored in computer registers, in a relational database as a table having a plurality of different fields and records, XML documents or flat files. The data may also be formatted in any computer-readable format such as, but not limited to, binary values or Unicode. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any well-known processor, such as processors from Intel Corporation or AMD. Alternatively, the processor may be a dedicated controller such as an ASIC. Although FIG. 1 functionally illustrates the processor and memory as being within the same block, it will be understood by those of ordinary skill in the art that the processor and memory may actually comprise multiple processors and memories that may or may not be stored within the same physical housing. Accordingly, references to a processor or computer will be understood to include references to a collection of processors or computers or memories that may or may not operate in parallel.

The computer 110 may be at one node of a network 195 and capable of directly and indirectly communicating with other nodes of the network. For example, computer 110 may comprise a web server that is capable of communicating with client devices 170-71 via network 195 such that server 110 uses network 195 to transmit and display information to user 190 on display 160 of client device 170. Server 110 may also comprise a plurality of computers that exchange information with different nodes of a network for the purpose of receiving, processing and transmitting data to the client devices; in this instance, the client devices will typically still be at different nodes of the network than any of the computers comprising server 110.

Figure 2:
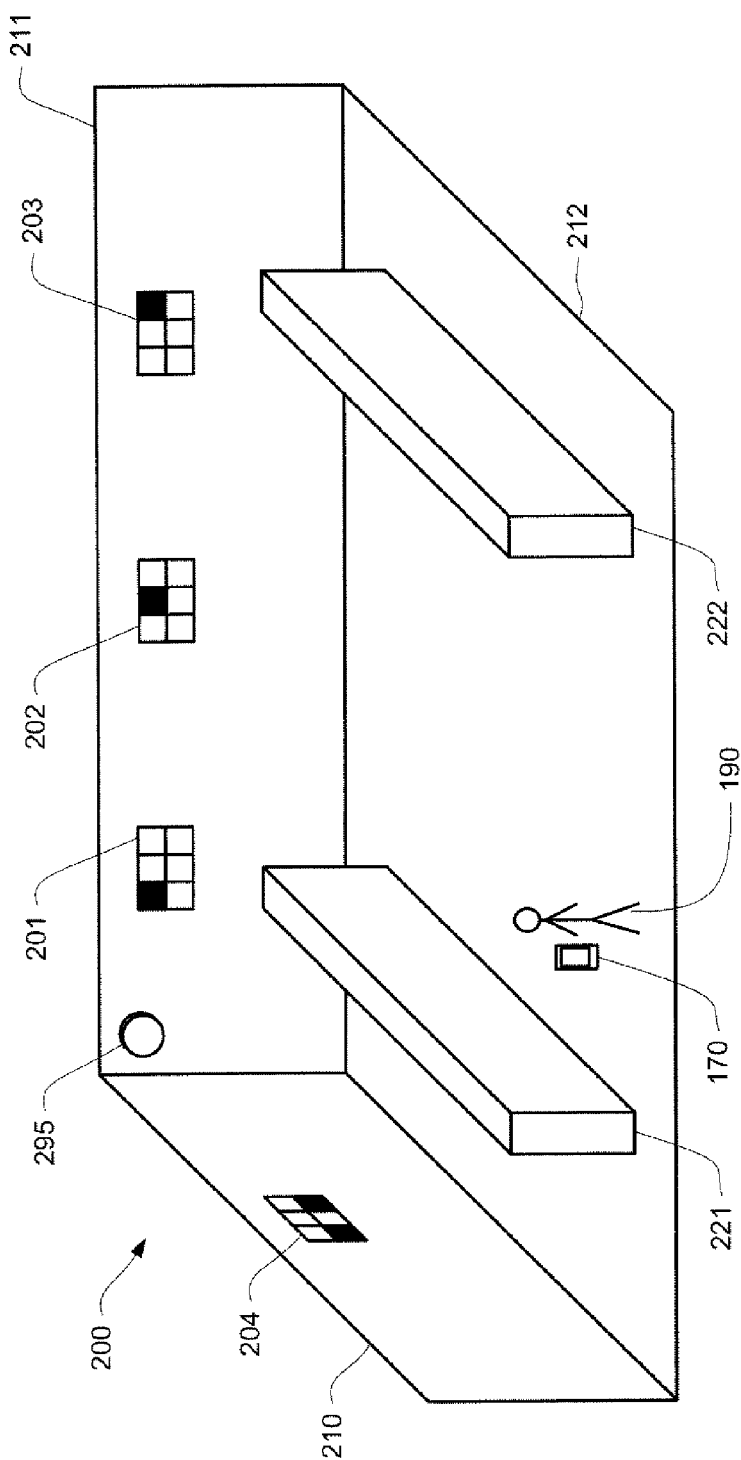
FIG. 2 is a perspective view of a space, client device and visual beacons in accordance with an aspect of the system and method.

Network 195, and intervening nodes between server 110 and client devices, may comprise various configurations and use various protocols including the Internet, World Wide Web, intranets, virtual private networks, local Ethernet networks, private networks using communication protocols proprietary to one or more companies, cellular and wireless networks (e.g., WiFi), instant messaging, HTTP and SMTP, and various combinations of the foregoing. Although only a few computers are depicted in FIGS. 1-2, it should be appreciated that a typical system can include a large number of connected computers.

Each client device may be configured similarly to the server 110, with a processor, memory and instructions. Each client device 170-71 may be a personal computer intended for use by a person 190-191, and have all of the components normally used in connection with a personal computer such as a central processing unit (CPU), memory (e.g., RAM and internal hard drives) storing data and instructions, an electronic display 160 (e.g., a monitor having a screen, a small LCD touch-screen, a projector, a television, or any other electrical device that is operable to display information), user input 162 (e.g., a mouse, keyboard, touch-screen or microphone), camera 163, speakers, a network interface device, and all of the components used for connecting these elements to one another.

Although the client devices 170-71 may comprise a full-sized personal computer, the system and method may also be used in connection with mobile devices capable of wirelessly exchanging data with a server over a network such as the Internet. By way of example only, client device 170 may be a wireless-enabled PDA or a cellular phone capable of obtaining information via the Internet. The user may input information using a small keyboard (in the case of a Blackberry phone), a keypad (in the case of a typical cell phone) or a touch screen (in the case of a PDA). Indeed, computers in accordance with the systems and methods described herein may comprise any device capable of processing instructions and transmitting data to and from humans and other computers including general purpose computers, network computers lacking local storage capability, and set-top boxes for televisions.

Although certain advantages are obtained when information is transmitted or received as noted above, other aspects of the system and method are not limited to any particular manner of transmission of information. For example, in some aspects, information may be sent via a medium such as an optical disk or portable drive. In other aspects, the information may be transmitted in a non-electronic format and manually entered into the system. Yet further, although some functions are indicated as taking place on a server and others on a client, various aspects of the system and method may be implemented by a single computer having a single processor.

FIG. 2 illustrates an environment in which the system and method may operate. Interior space 200 comprises the interior of a building, such as one bounded by at least back wall 211, left wall 210 and floor 212. It may also include any items that might be typically found within a building, such as shelves 221-22 that form aisles between the shelves. It shall be assumed for the example purposes only that the space 200 comprises the interior of a store. For ease of reading, the figures illustrate only a few items that are not necessarily to scale. For example, the space may be further defined by a ceiling.

Located at various positions within the space are visual beacons. Although visual beacons may take various forms as noted in more detail below, FIG. 2 provides the example of the visual beacons 201-04 having a checkerboard pattern. The beacons may 201-04 may share some visual characteristics (e.g., the outer border may be four feet high by six feet high, it may comprise a 2×3 grid pattern of either black or white cells) while differing in others (e.g., no two beacons may have the exact same pattern of colored grid cells). The beacons shown in FIG. 2 may be mounted posters or painted directly on the walls (in which case the beacon may be considered the painted portion of the wall). Although the beacons are shown as being disposed on a wall, visual beacons may be placed anywhere, including a ceiling.

Space 200 may include a device, such as WiFi wireless router 295, that enables client devices to wirelessly communicate with the server 110.

Figure 4:
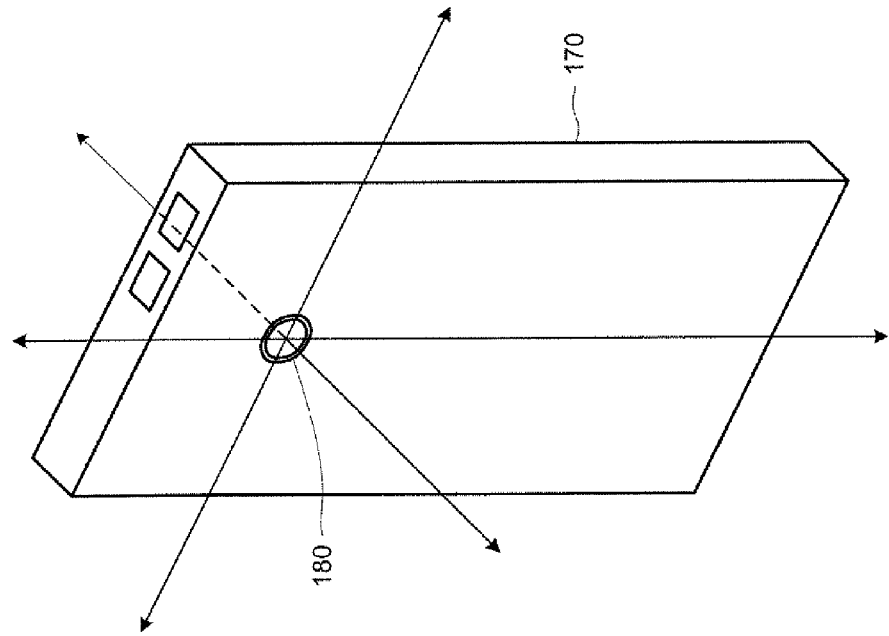
FIG. 4 is another perspective view of a client device in accordance with an aspect of the system and method.
Figure 3:
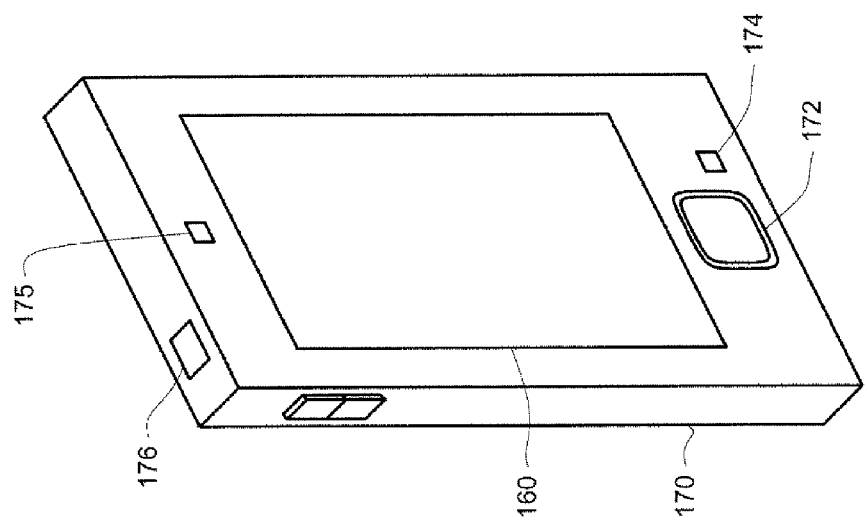
FIG. 3 is a perspective view of a client device in accordance with an aspect of the system and method.

As shown in FIGS. 3-4 and noted above, the client device may comprise a PDA/phone having a touch-screen display 160, general-purpose button 172, speaker 175, microphone 174 and a cell-phone antenna 176. As shown in FIG. 4, the back includes a camera 163.

Figure 5:
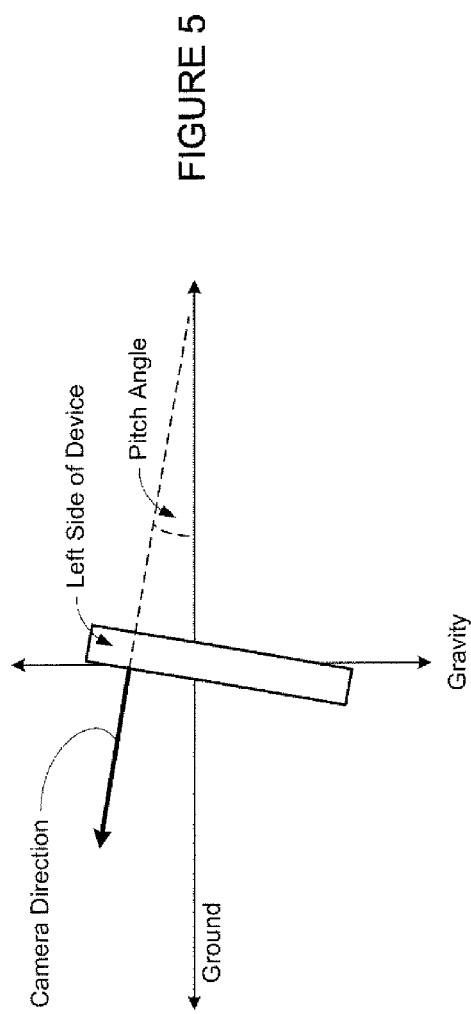
FIG. 5 is a diagram functionally illustrating the pitch of a client device relative to ground level.
Figure 6:
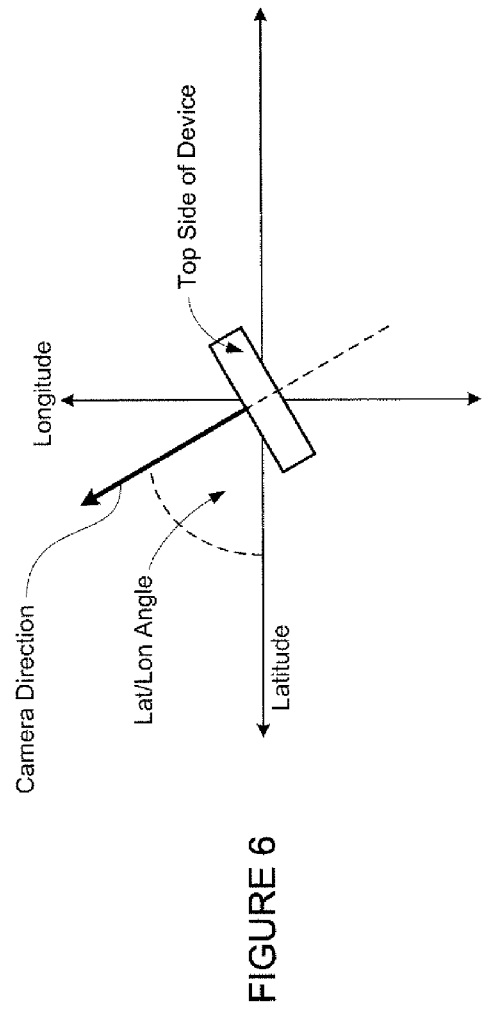
FIG. 6 is a diagram functionally illustrating the rotation of a client device relative to ground level.

The camera of the device may be oriented in a particular direction as shown by the compass rose in FIG. 4 and schematically in FIGS. 5 and 6. It shall be assumed for ease of understanding and not limitation that the camera angle is fixed relative to the orientation of the device. In that regard, FIG. 5 illustrates a potential pitch of the device relative to the ground (as seen looking towards the left side of the device), e.g., relative to the plane perpendicular to the direction of gravity. FIG. 6 illustrates a potential rotation of the device relative to the ground (as seen looking towards the top of the device), e.g., its rotation relative to the direction of gravity. Collectively, the pitch, yaw and roll may define a camera angle in three-dimensions.

One of the programs stored within the instructions of client devices 170 may comprise a Position Determination Program, the functions of which are explained in more detail below. The data 135 of the server 110 may include various data explained in more detail below.

Figure 29:
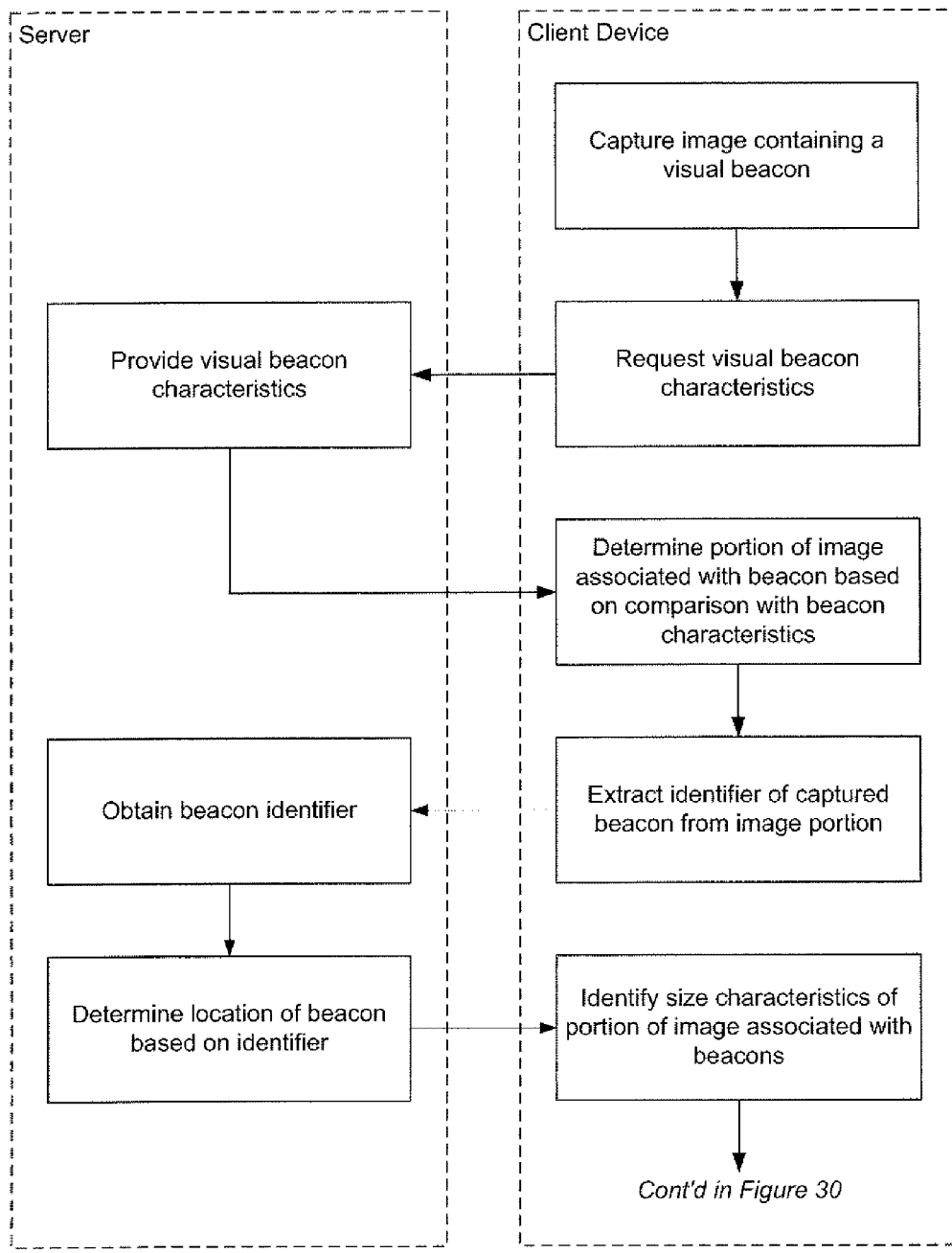
FIG. 29 is a flowchart in accordance with an aspect of the system and method.
Figure 30:
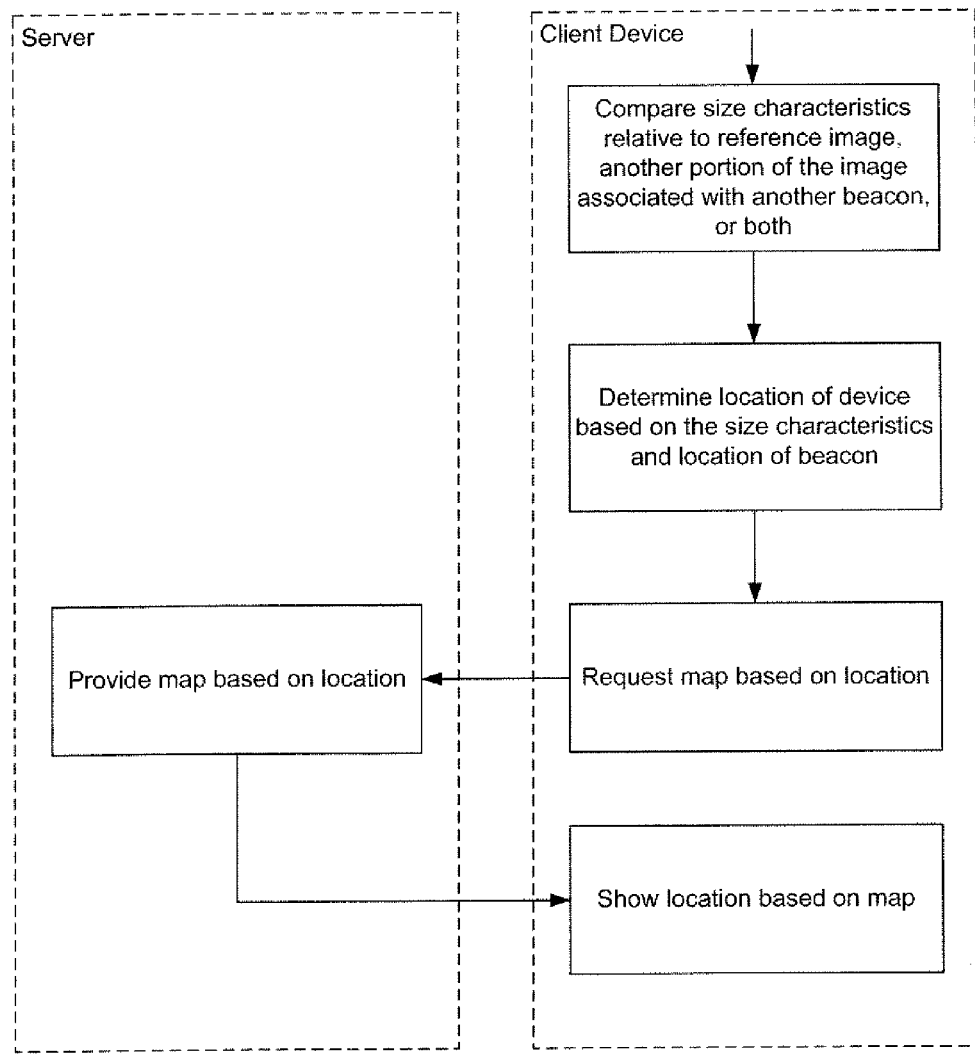
FIG. 30 is a flowchart in accordance with an aspect of the system and method.

In addition to the operations illustrated in FIGS. 29-30, various operations in accordance with a variety of aspects of the invention will now be described. It should be understood that the following operations do not have to be performed in the precise order described below. Rather, various steps can be handled in reverse order or simultaneously.

It will be further understood that the sample values, types and configurations of data shown in the figures are for the purposes of illustration only. In that regard, system and methods in accordance with the present invention may include different data values, types and configurations, and may be provided and received at different times (e.g., via different web pages) and by different entities (e.g., some values may be pre-suggested or provided from different sources).

In one aspect, a method is provided whereby the client device captures an image that includes a visual beacon, and uses the image area that is occupied by the visual beacon to estimate the device's position. A description of just one example of such a method follows.

The client device may determine whether any portion of the image captured by the device's camera corresponds with a visual beacon. For example, upon entering a building interior 200, the user use may orient the client device so that it captures an image that includes at least one visual beacon. As shown by way of example in FIG. 7, user 190 of client device 170 may orient the field of view 740 of the device's camera 163 such that it includes beacon 202 (Dashed lines 750 along the floor 212 in FIG. 7 and similar figures indicate the location of the client device 170 relative to the interior space).

Figure 7:
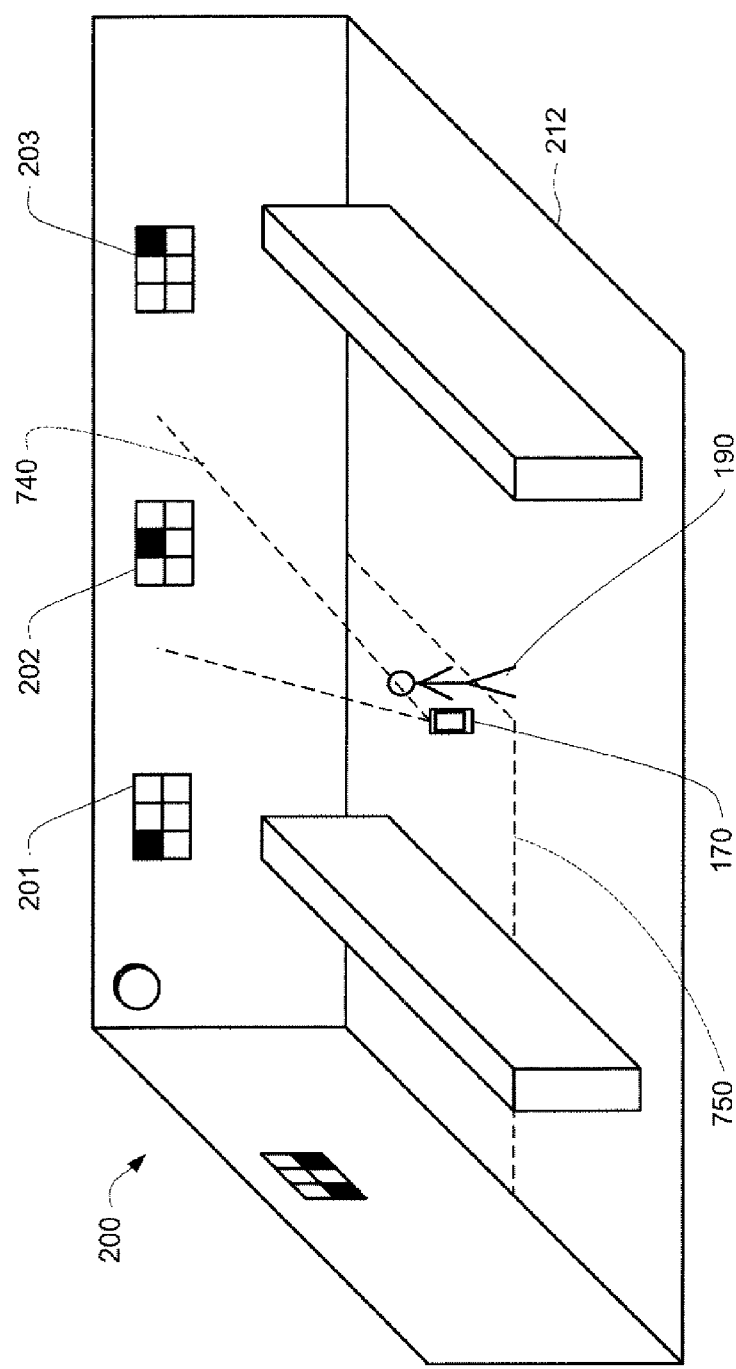
FIG. 7 is a perspective view of a space, visual beacons and a client device at a first position in accordance with an aspect of the system and method.
Figure 8:
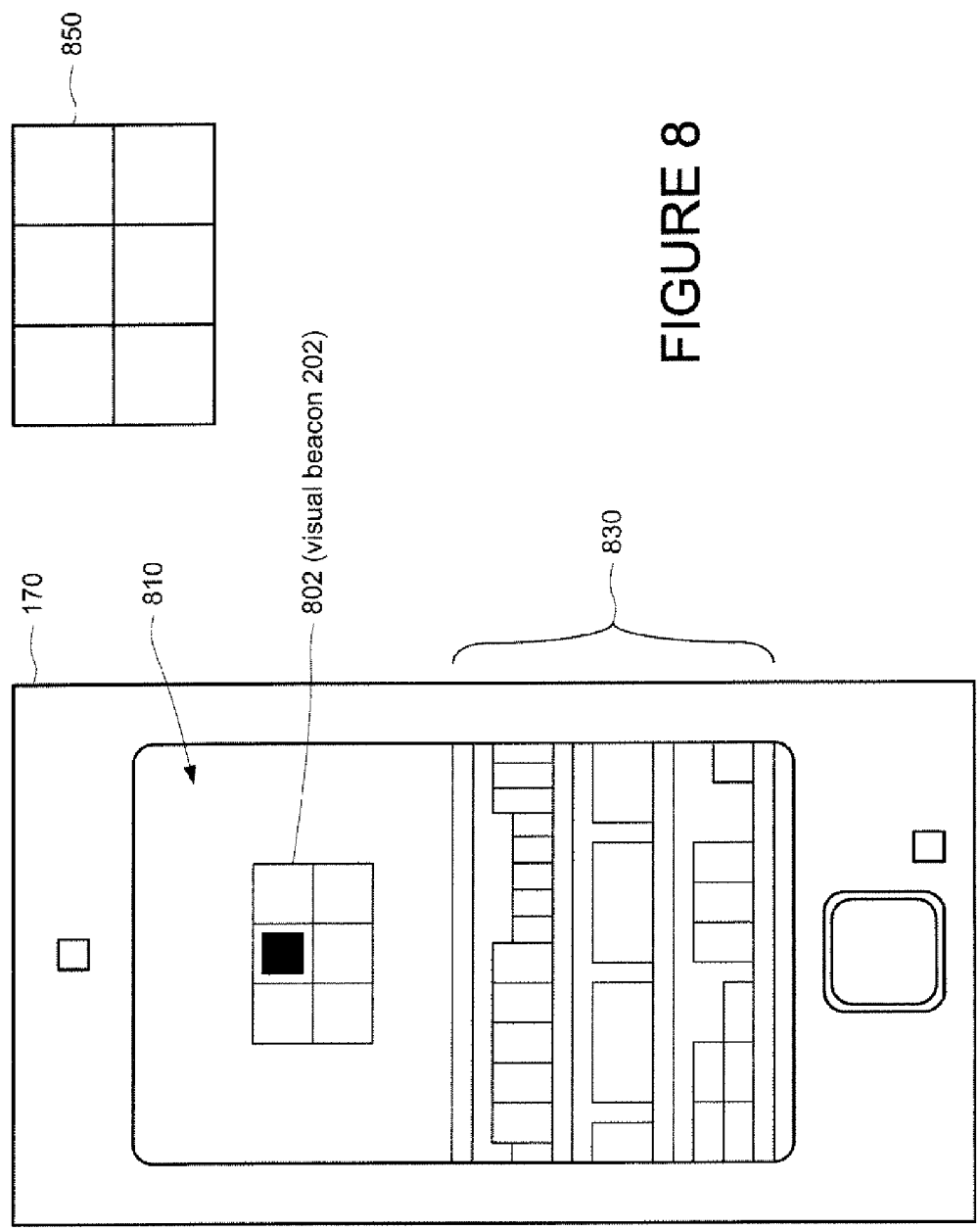
FIG. 8 is a view of a client device and image captured by the device at the first position, and a reference image, in accordance with an aspect of the system and method.

FIG. 8 provides an example of what the image 810 captured by the camera may look like when the client device 170 is in the position shown in FIG. 7. In that regard, the camera may have captured visual beacon 202 (the portion of the captured image corresponding with the visual beacon 202 being referenced by numeral 802) as well as a variety of products on shelves 830 within image 810.

The processor of the client device determine whether the captured image includes the image of a visual beacon. For instance, based on the user executing the Position Determination Program, the program may compare portions of the capture image 810 with a reference image 850, where the reference image includes the visual characteristics shared by the various visual beacons (e.g., a 2×3 checkerboard pattern). The reference image may be a digitized bitmap of the visual beacon as if a user were facing beacon directly (e.g., without distortion based on viewing the beacon from an angle). The Position Determination Program may obtain reference image 850 by querying the server 110 for the image via the network 195.

The system and method is not limited to any particular manner of matching portions of the captured image to the reference image of a visual beacon. By way of example only, sets of scale-invariant feature transform (SIFT) may be computed on a pair of images (e.g., one being the image captured by the camera and the other being a reference image) and used to generate a value indicative of the images' similarity. The system and method may analyze the number of matching features that are geometrically consistent somewhere in both images using any number of different geometric models, such as affine, homography or projective geometry transformations. Yet further, features may be identified by looking for edges, where edges are further identified by quick changes in color. Moreover, the techniques described in A. Oliva and A. Torralba, "Building the gist of a scene: The role of global image features in recognition. Visual perception. Progr. Brain Res.," 155:23-36, 2006, as well as H. Neven, G. Rose and W. Macready, "Image recognition with an adiabatic quantum computer I. Mapping to quadratic unconstrained binary optimization," arXiv:0804.4457v1, may also be used.

Moreover, the system and method is not limited to matching the captured image to a bitmap. Rather, the system and method may detect the presence of visual characteristics of a visual beacon within a captured image in other ways as well. By way of example only, the client device may use edge detection to identify edges within the image, store the endpoints of each edge that corresponds with a line segment, and use a variety of algorithms to determine whether the various endpoints correspond with a grid like that of reference image 850.

Figure 9:
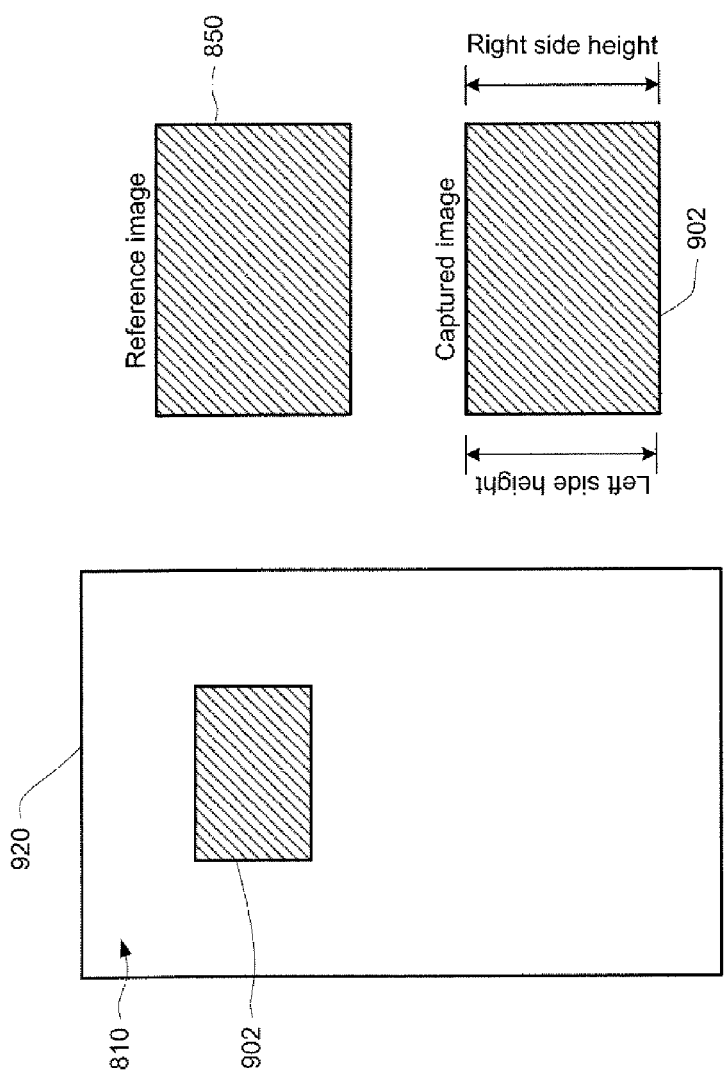
FIG. 9 illustrates the portion of an image occupied by a visual beacon relative to the bounds of the image captured from the first position and a reference image, in accordance with an aspect of the system and method.

The client device may estimate the orientation of the device relative to the visual beacon based on the size and position of the area occupied by beacon image relative to another portion of the image. For example, FIG. 9 illustrates the area 902 occupied by the image of the beacon relative to the boundaries 920 of the image 810. In that regard, it will be noted that the area 902 has the exact same shape as reference image 850, e.g., the size of the top and bottom edges are the same, as are the sides. Moreover, the outer proportions of the reference image and the visual beacon image match exactly, i.e., the ratio of height to width of both images are identical. Accordingly, the Position Determination Program may determine that the device is facing the visual beacon directly and not from an angle.

Figure 10:
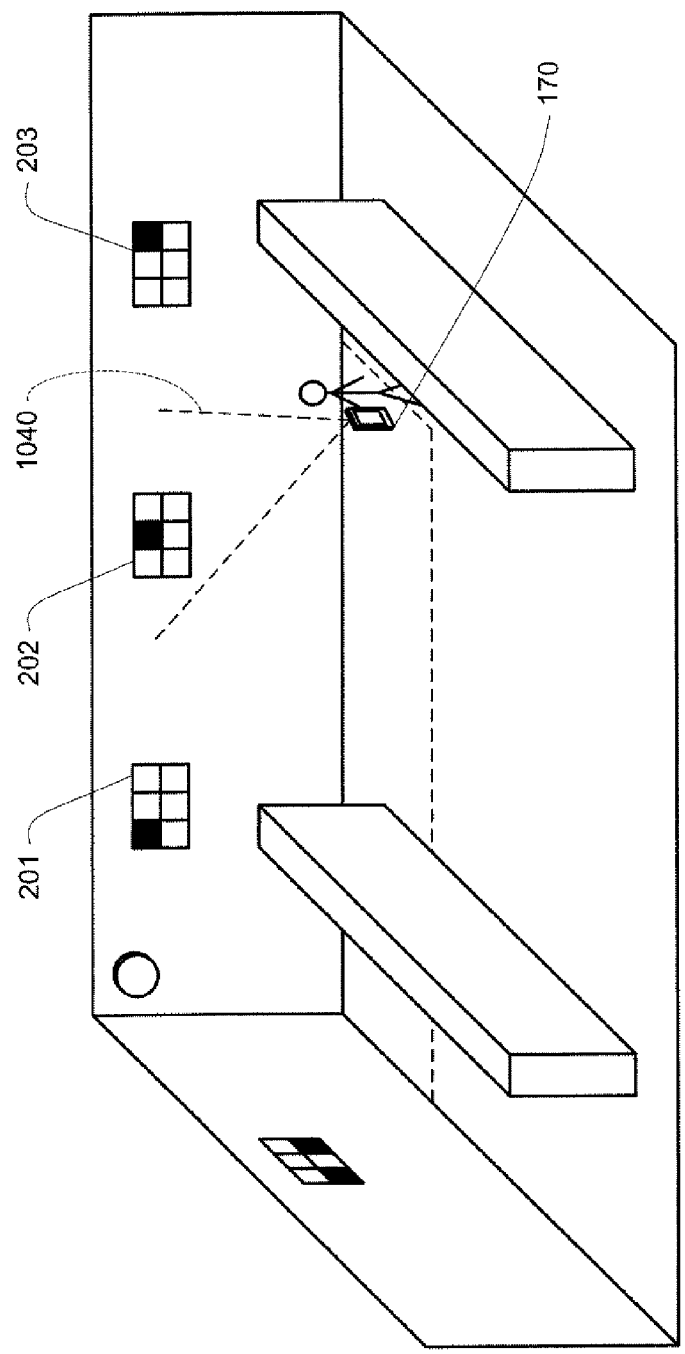
FIG. 10 is a perspective view of a space, visual beacons and a client device at a second position in accordance with an aspect of the system and method.
Figure 11:
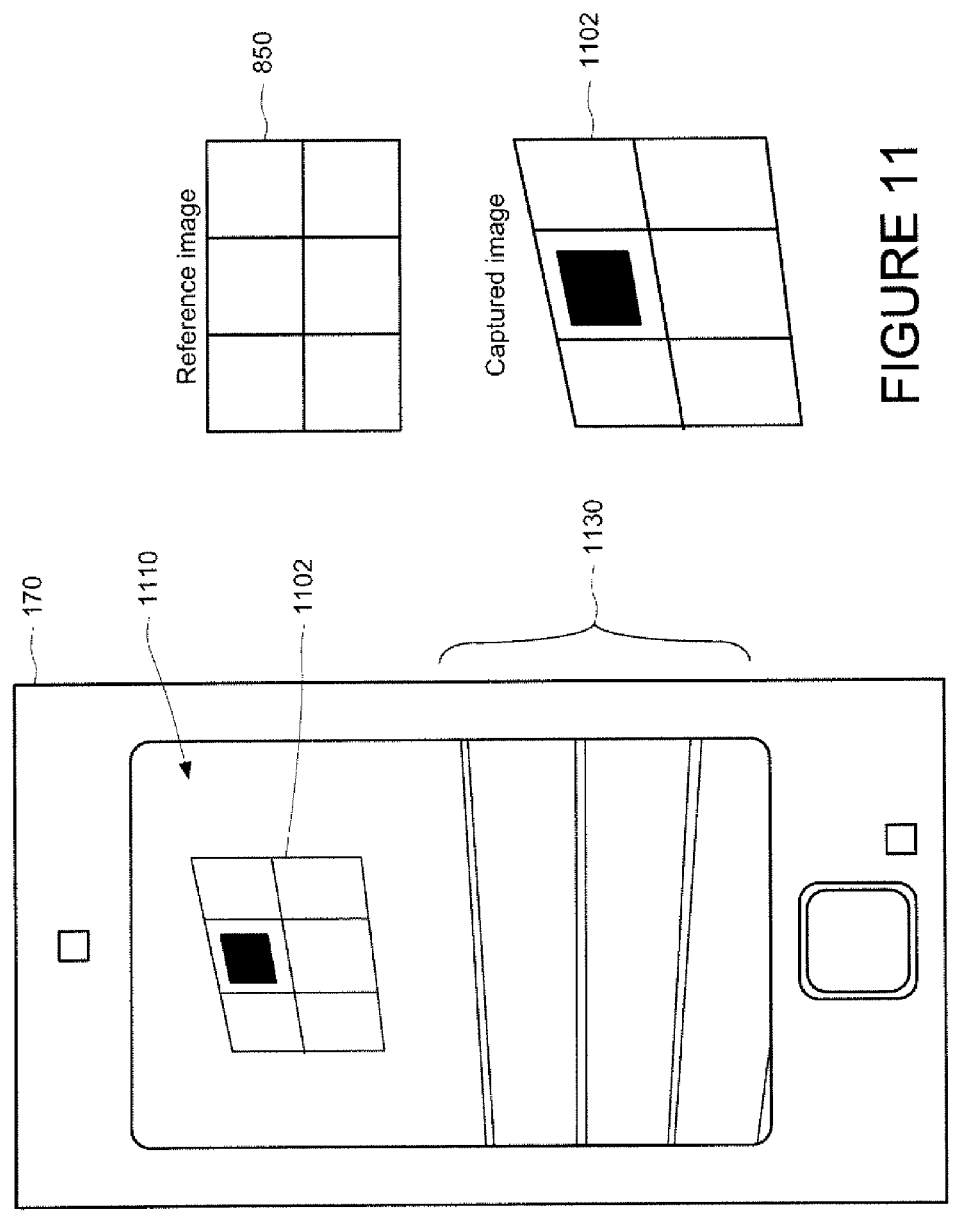
FIG. 11 is a view of a client device and image captured by the device at the second position, and a reference image, in accordance with an aspect of the system and method.

This may be contrasted with the appearance of the visual beacon when it is captured from a different angle. In FIG. 10, the user has oriented client device 170 towards visual beacon 202, but this time at an angle to the face of the visual beacon 202. The resulting captured image is shown in FIG. 11. In the example image 1110, the camera captured visual beacon 202 (image portion 1102) and shelving 1130 (the products being removed for clarity). Although the outer boundaries of the captured visual beacon image 1102 are different from the reference 850, the image matching algorithms are preferably configured to find matches in spite of skew. Accordingly, the processor may identify portion 1102 of the image 1110 as corresponding with a visual beacon.

As shown in FIG. 12, the shape of the image area 1202 occupied by the visual beacon no longer exactly matches that of the reference image 850. As is apparent from the figure, to the extent the visual beacon image may be considered rectangular shaped, it is now quite skewed because it was captured from an angle instead of directly facing the image. Moreover, the sides are no longer equally proportioned. Rather, as shown by comparison 1250, the right side of the beacon image is taller—as captured within the image—than the left side. This is a natural consequence of the fact that the client device was closer to the right side of the visual beacon than the left side.

The processor of the client device may determine the number of pixels occupied by the portion of the image associated with the object. For example, the entire image 1110 captured by the camera may be 250 pixels wide by 400 high. By identifying the portion 1210 of the image that corresponds with a visual beacon, the processor of client device may determine that the right edge of the beacon is 160 pixels long. It may also determine that the left side is 150 pixels long.

By analyzing the size of images capturing visual beacons, the system and method may determine the orientation of the client device relative to a surface of the visual beacon. For example, if the left-to-right ratio of the captured image is equal to the left-to-right side ratio of the reference shape, the client device may determine that it is facing the visual beacon directly (where left-to-right ratio means the ratio of the height of the left edge to the height of the right edge). However, if the left-to-right ratio of the captured image is greater than the left-to-right ratio of the reference image, the client device may determine that it is facing the visual beacon from the left. Similarly, if the left-to-right ratio of the captured image is less than the left-to-right ratio of the reference image, the client device may determine that it is facing the visual beacon from the right. Thus, as shown in FIG. 12, the client device may determine that the client device is facing the visual beacon from the right.

Figure 14:
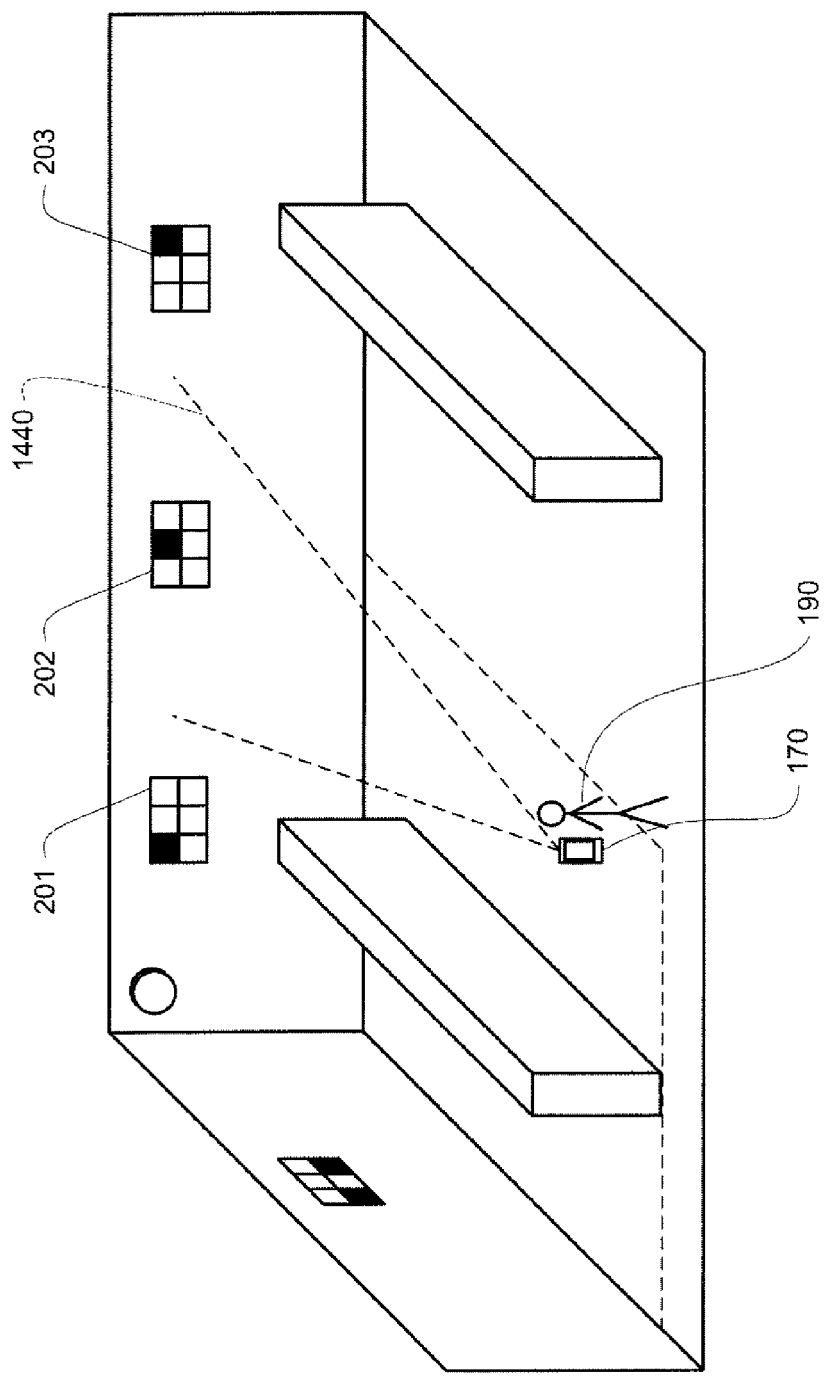
FIG. 14 is a perspective view of a space, visual beacons and a client device at a third position in accordance with an aspect of the system and method.
Figure 15:
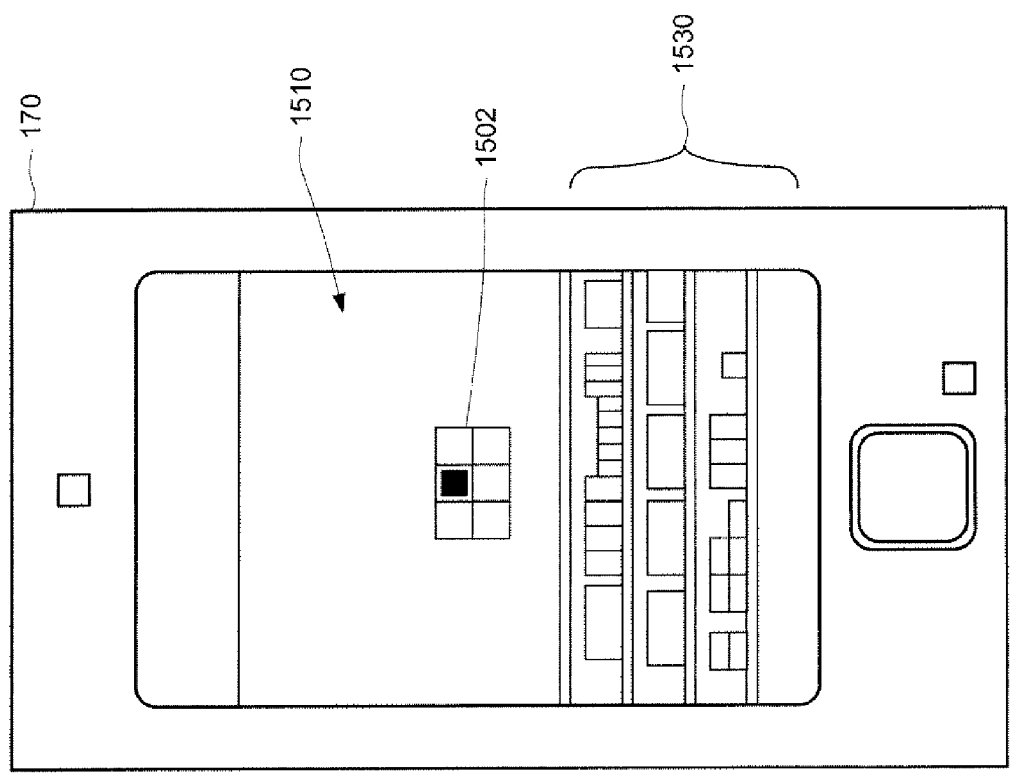
FIG. 15 is a view of a client device and image captured by the device at the third position, and a reference image, in accordance with an aspect of the system and method.

The captured image area of the visual beacon may also be used to estimate the distance between the device and the visual beacon. FIG. 14 illustrates a location for the client device that is directly facing the visual beacon 202 yet farther from the visual beacon than the location of the device in FIG. 7. In that regard, when the image is captured as shown in FIG. 15, the visual beacon will appear more distant, i.e., the captured image of the visual beacon 202 (image portion 1502) and shelving 1530 will appear smaller.

Figure 16:
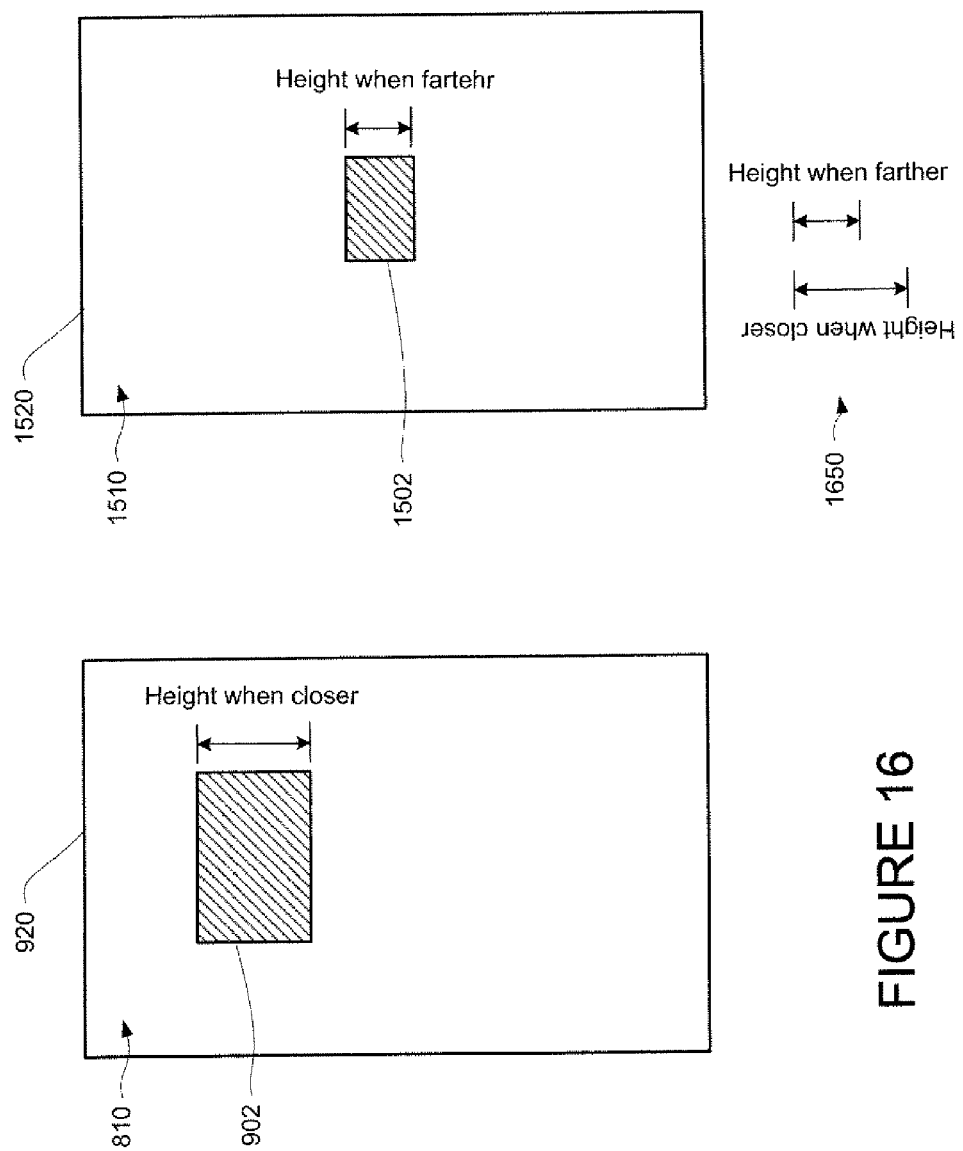
FIG. 16 illustrates the portion of an image occupied by a visual beacon relative to the bounds of the image captured from the third position and a reference image, in accordance with an aspect of the system and method.

The difference in sizes is particularly apparent when the visual beacon image taken is compared with the image of the beacon taken at a closer distance. FIG. 16 compares the relative sizes of the captured visual beacon image of FIGS. 7-8 against FIG. 14-15. The captured image 1502 of the visual beacon occupies a much smaller area relative to the image bounds 1520 when the client device is farther away than the area occupied by image 902 of the visual beacon when the client device is closer. The relative heights may be contrasted at comparison 1650.

Accordingly, by comparing the size of the captured visual beacon image relative to the bounds of the field of view, the system and method may determine the distance of the client device relative to a surface of the visual beacon. For example, if the visual beacon portion occupies all or nearly all of the captured image, the client device may be estimated to be extremely close to the visual beacon. If the visual beacon portion occupies only a very small portion of the captured image, the client device may be estimated to relatively far from the visual beacon. Other distances may be estimated based on sizes in between.

Figure 13:
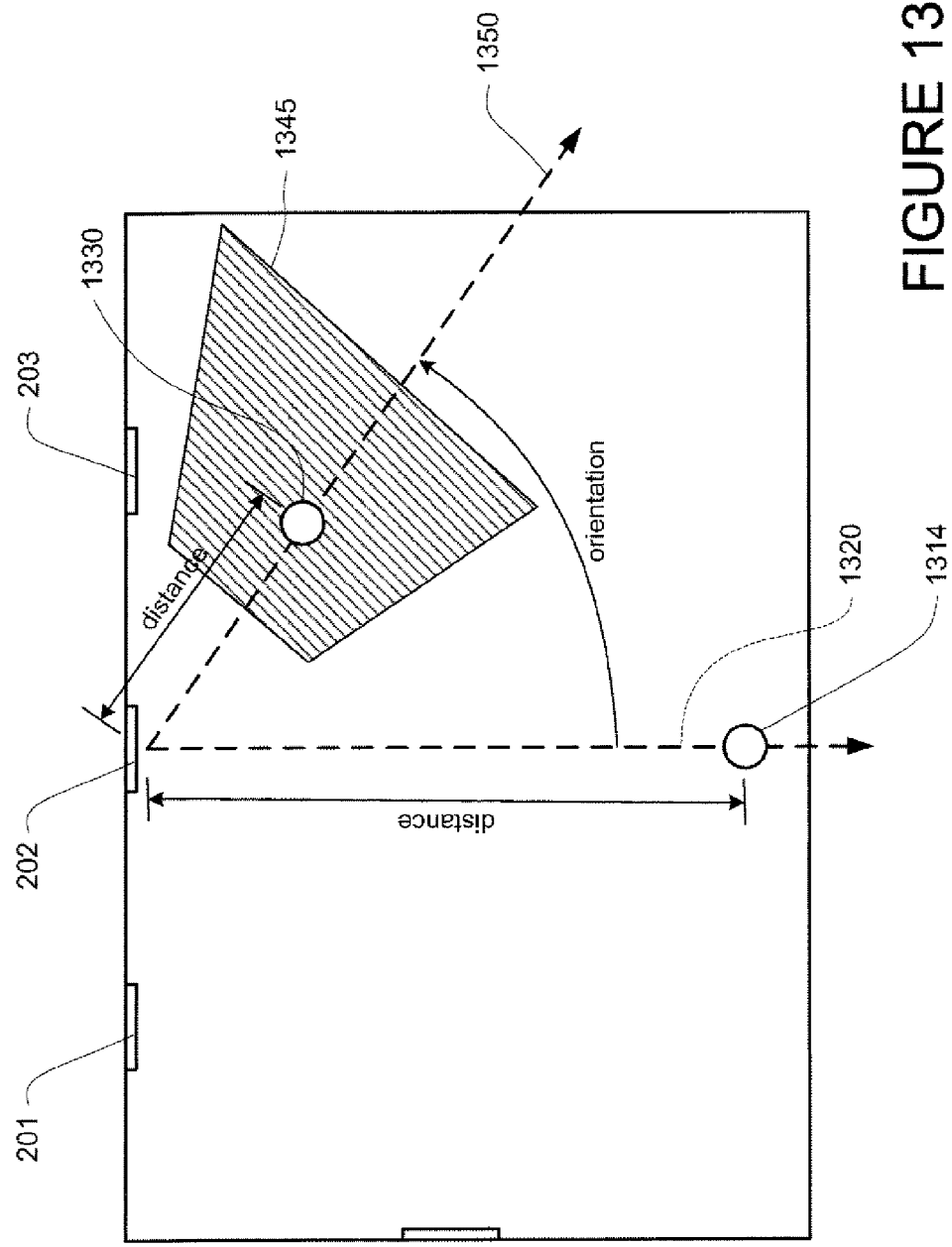
FIG. 13 is a diagram functionally illustrating the position of a client device within an interior space in accordance with an aspect of the system and method.

In one aspect, the system and method uses both the shape of the visual beacon image (relative to its shape at a known angle) and the size of the visual beacon image (relative to bounds of the entire captured image) to estate the location of the device. In that regard, and as shown in FIG. 13, the device may determine based on image 1110 that the client device is at a location 1330 that is within an area 1345 that is to the right of the visual beacon 202 and at a distance that is neither extremely close to, nor extremely far from, the visual beacon. The distance and orientation may be estimated through an optimization process that finds the best rigid transformation matching the beacon image distortion. A detailed description of one such algorithm is set forth in section entitled "CALCULATING CAMERA POSE".

As noted above, the position of the device relative to a visual beacon may be determined based on the size and shape of the visual beacon within an image captured by the device. However, the visual beacon may also provide additional information by which the device's position relative to a reference system applicable to the entire geographic space (hereafter, "absolute position") is also determined.

Figure 17:
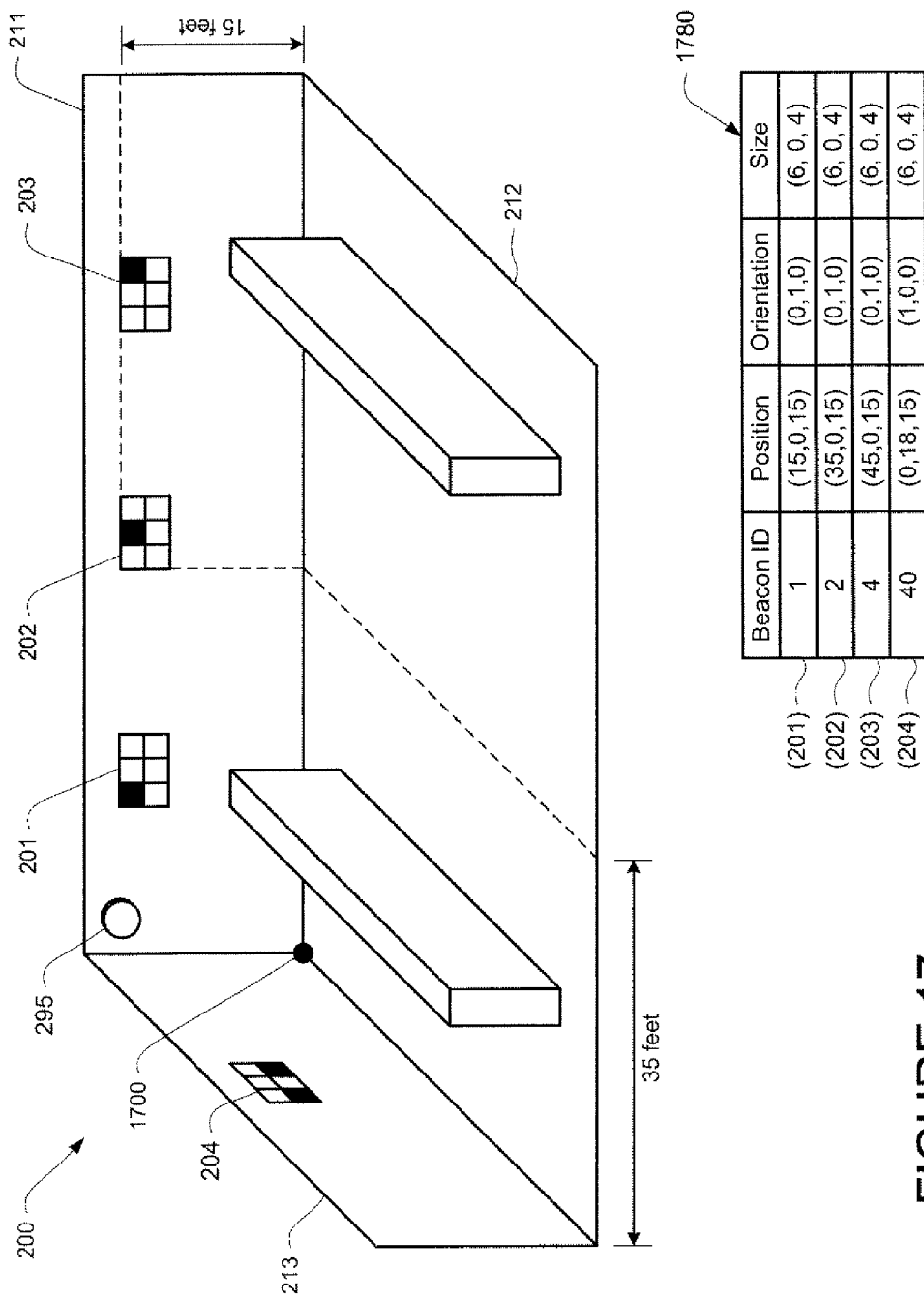
FIG. 17 is a perspective view of a reference system for a space and data defining the location of visual beacons relative to the reference system, in accordance with an aspect of the system and method.

As shown in FIG. 17, the positions of objects within the geographic space 205 may be defined with respect to a geographic reference system, including but not limited to a three-dimensional Cartesian coordinate system. For example, the system may define the location of any object with respect to distance from the left wall 213, back wall 211 and floor 212 such that the origin of the reference system is considered the back-left corner 1700 of the floor. In that regard, if visual beacon 202 is 35 feet from the left wall, zero feet from back wall (because it is mounted on the wall) and 15 feet above the floor, its coordinates may be expressed as (35, 15, 0). The orientation of the visual beacons may also be defined with respect to the reference system, e.g., whether it faces in a direction away from the left wall, the back wall or the floor. The orientation of visual beacon 202 may thus be expressed as (0, 1, 0) because it faces away from the back wall. The coordinates of the visual beacons may electronically in a table such as that shown in table 1780.

The positions of the visual beacons may be made available to devices for download. For instance, wireless router 295 may transmit the table 1780 in response to receiving a request from the client device's Position Determination Program.

Figure 18:
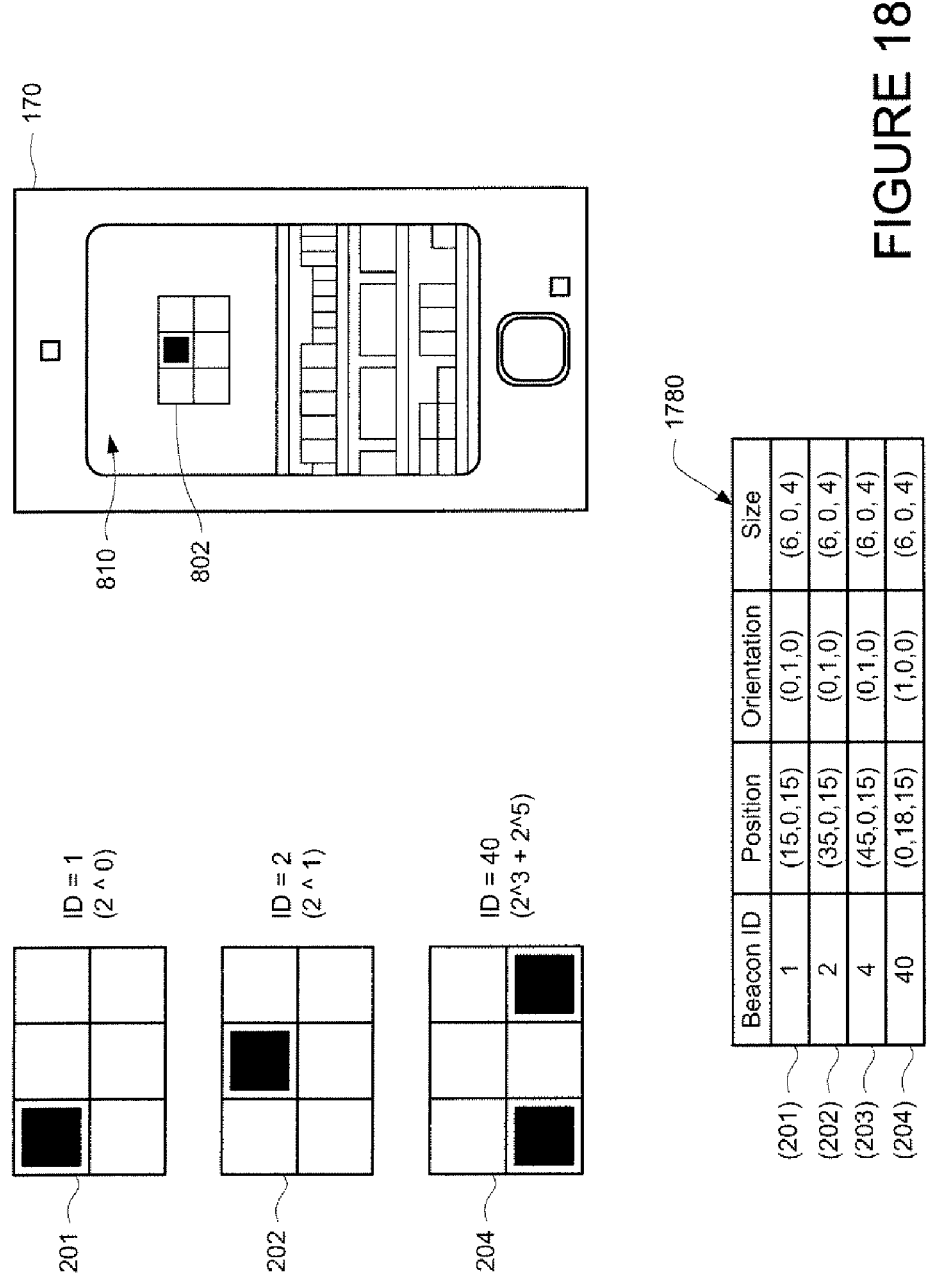
FIG. 18 illustrates the identifiers of visual beacons in accordance with an aspect of the system and method.

The beacons may contain visual indicia from which their absolute position may be determined. As shown in FIG. 18, that indicia may comprise a pattern or the like that uniquely identifies the beacon. The pattern of visual beacon 201 may indicate that its unique identification is "1" if, by way of example, each square from the top-left represents a higher power of 2. When the image 802 of the visual beacon is identified within the captured image 802, its ID may be determined by the device's processor based on the pattern. If the client device has downloaded table 1780 into its memory, it may look up the position of the beacon from the table.

Accordingly, the client device's absolute position may be estimated based on the device's position relative to the visual beacon and the visual beacon's absolute position. For instance, as shown in FIG. 13, the client device may determine that it is the portion of the store corresponding with area 1345.

It may be difficult for the device to determine its orientation and distance relative to a single visual beacon. For instance, the size of a beacon within the image captured by the device's camera depends on the characteristics of the camera, e.g., whether it is zoomed in or out and whether the lens is a wide angle lens. Yet further, a single beacon may only convey enough information to determine a general area rather than a specific position.

Figure 19:
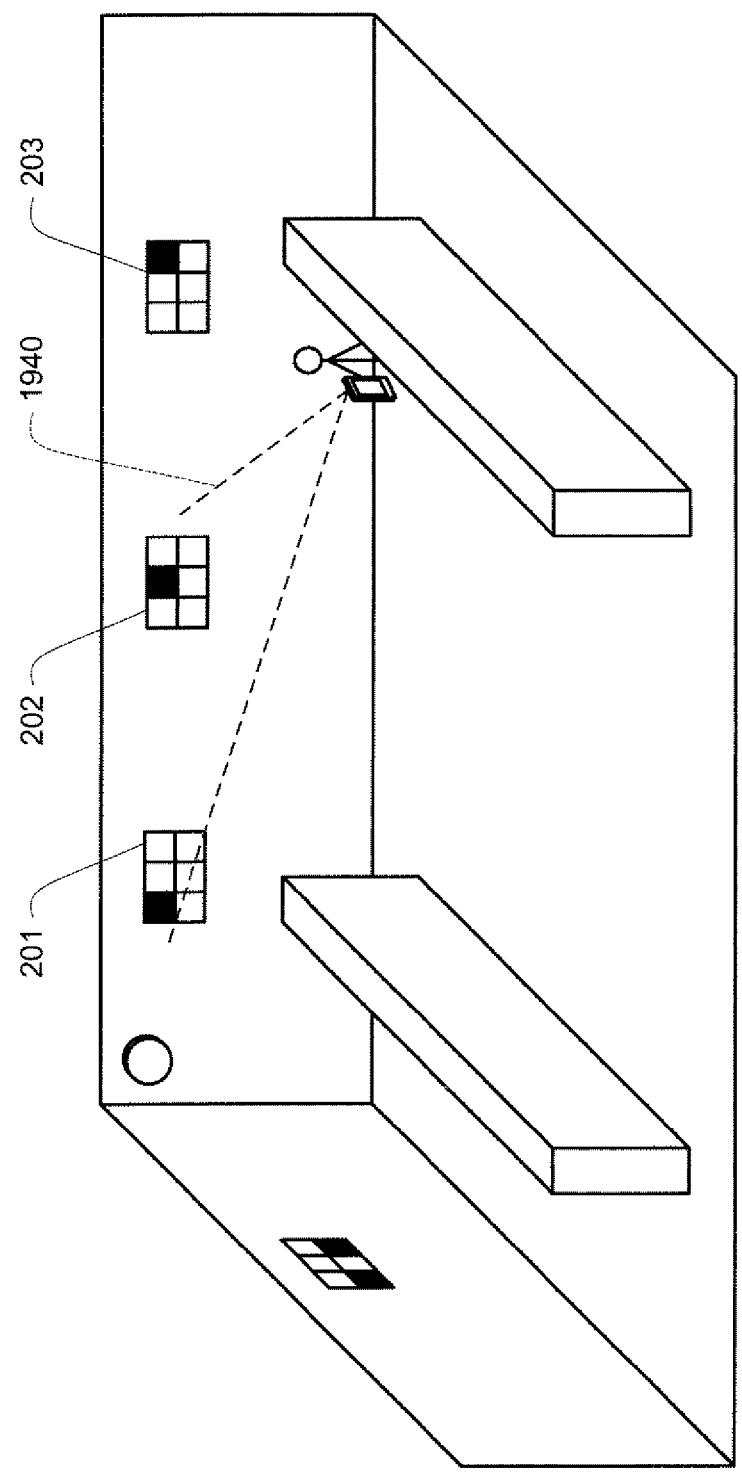
FIG. 19 is a perspective view of a space, visual beacons and a client device at a position that captures two visual beacons in accordance with an aspect of the system and method.
Figure 20:
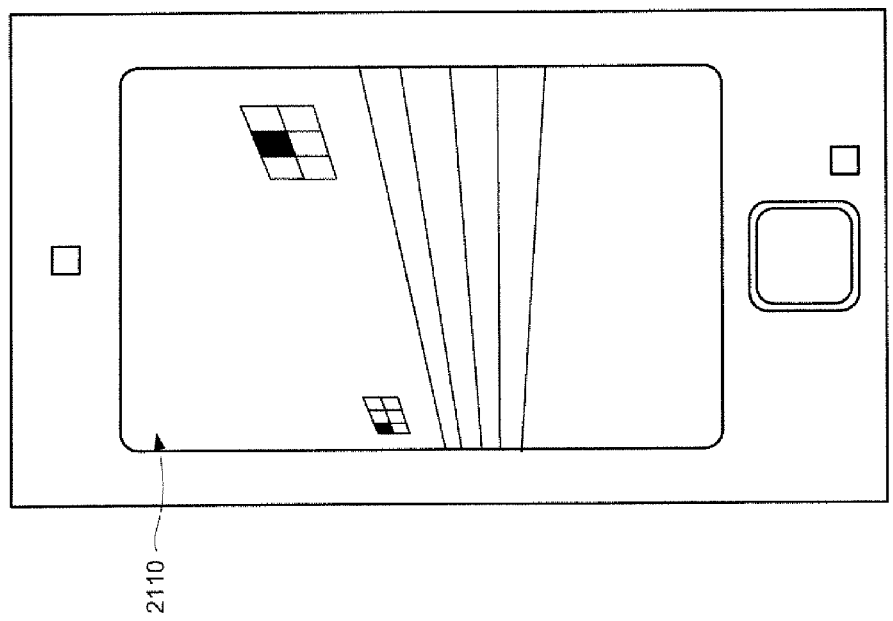
FIG. 20 is a view of a client device, a reference image, and an image captured by the device that includes two visual beacons, in accordance with an aspect of the system and method.

In that regard, another aspect of the system and method uses two or more beacons to determine the position the device. As shown in FIG. 19, user 1920 may orient the field of view 1940 of the client device towards both visual beacons 201 and 202, with the resulting image 2010 shown in FIG. 20.

Figure 21:
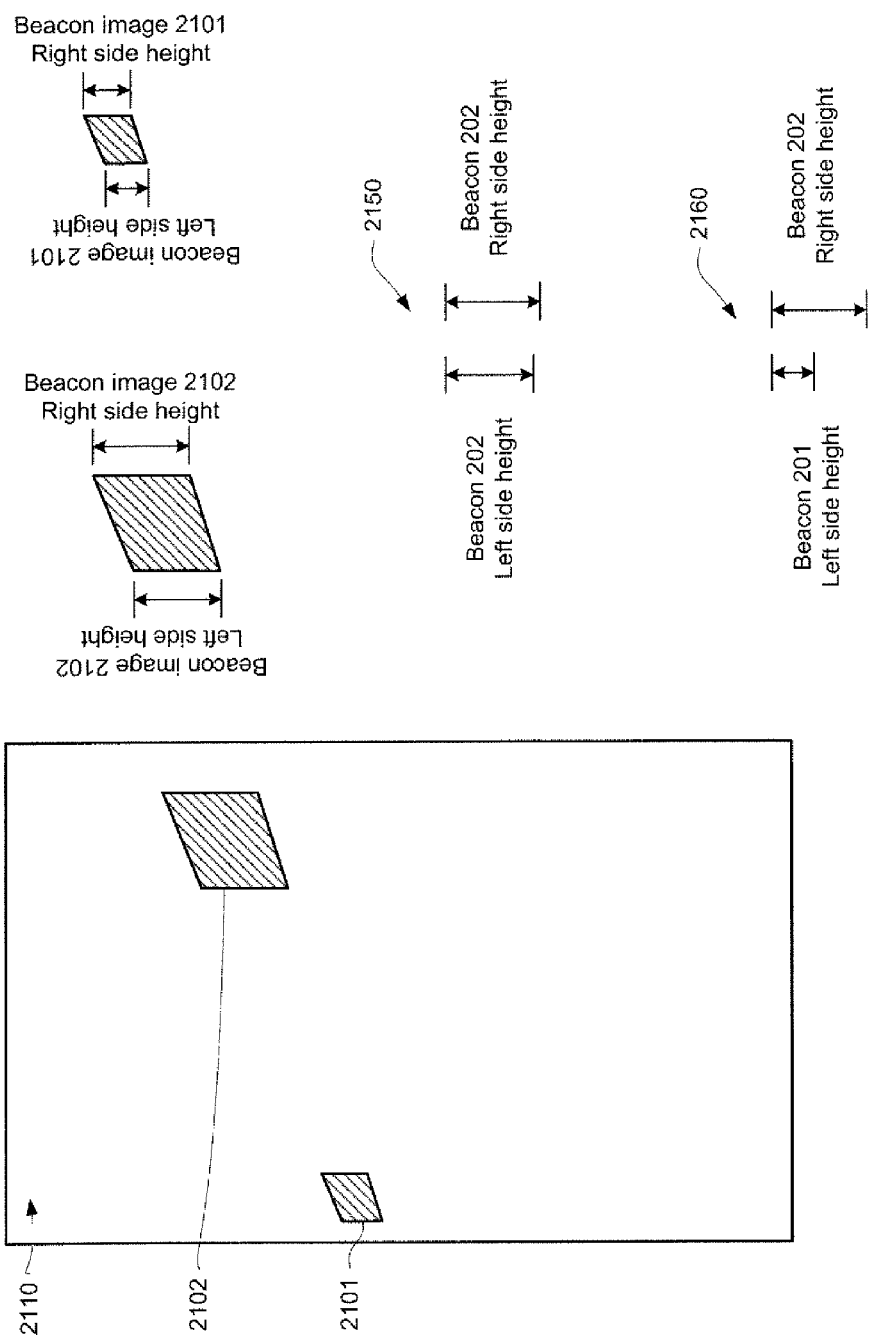
FIG. 21 illustrates the portions of an image occupied by two visual beacons relative to the bounds of the image, as well as a reference image, in accordance with an aspect of the system and method.

As shown in FIG. 21, the device may identify the shapes 2101 and 2102 of both visual beacons 201 and 202, respectively, within the image. As will be noted from comparison 2150, the left and right edges of beacon image 2102 are almost equal yet still different in view of the angle from which they were captured. On the other hand, the difference between the sizes of the two beacon images 2101 and 2102 is quite significant. As shown by comparison 2160, image 2102 of beacon 202 is a little over twice as high as image 2101 of beacon 201.

The absolute position of the client device may be calculated based on the image "areas" (e.g., the relative position) occupied by the beacons within the image captured by the client device on the one hand, and the data identifying the absolute position of the beacons on the other. For example, in addition to detailed method described in Appendix A, the processor may also assume that the height of the edge is directly proportional to the distance from the camera, e.g., the device's geographic distance from the left edge of beacon 701 is twice as far as the distance from the right edge of beacon 702. The processor may then use a lookup table to obtain the geographic distance between the beacon edges, e.g., the geographic distance from the left edge of beacon 702 and the right edge of beacon 702, and left edge of beacon 701 and the right edge of beacon 702. Because the relative distances from the device to the edges are known explained, and the absolute distances between the edges is known, and the visual angle between the two edges is known, the location of the device may be computed from the combination of relative and absolute distances. Moreover, such methods may be extended to multiple beacons by analyzing them as if they were a single beacon comprising a collection of points and lines.

As a result, the position of the client device relative to reference system may be determined as shown in FIG. 13, in which case the client device may determine that the device is located at position 1330.

If the difference in edge sizes of an individual visual beacon are insufficient to accurately determine the position of the device and three different visual beacons are in view (e.g., beacons 201, 202 and 204), the client device may use the relative areas of the beacon images (e.g., the total number of pixels associated with each beacon) to determine the relative distance from the beacons. From the relative areas and distances between the beacons within the images, and the beacons' absolute positions, the absolute position of the client device may be calculated accordingly.

Although the foregoing example was often described in connection with the position of the object with respect to the "left" and "right" of the visual beacons, it will be understood that the "up" and "down" component of the device's position may be similarly determined. In other words, the client device may calculate its position in three-dimensions.

Figure 22:
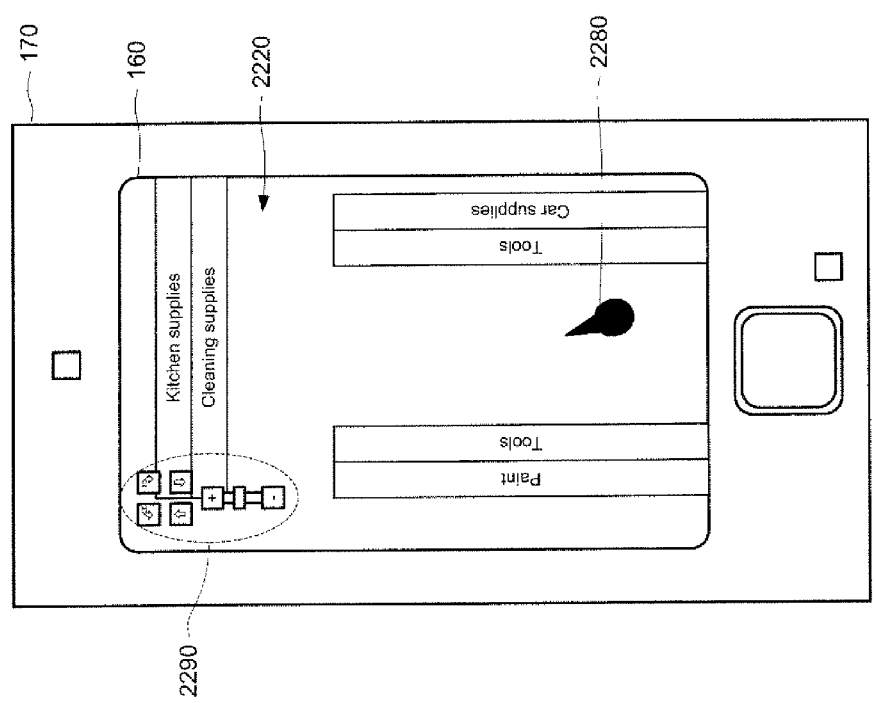
FIG. 22 illustrates a map displayed by a client device in accordance with an aspect of the system and method.

In one aspect of the system and method, the client device may be used to show the user a map of the geographic space and the user's position within it. In that regard and as shown in FIGS. 1 and 22, the Position Determination Program may request map information 2210 from server 110. In response, the server 110 may provide the client device with a map such as a floor plan. The server may also provide information identifying how the image corresponds with the absolute position of the space (such as the absolute position associated with the upper-left corner of the map and the scale of the map). Upon receipt, the client device may display and display the image that is sent in display 160 of client device 170. By way of example only, the map may show the aisles, shelves and general location of the items in the store. The device may also provide a cursor 2280 that indicates the estimated position of the device relative to the map, where the position was calculated based on the visual beacons. The Position Determination Program may also provide controls 2290 for controlling panning, rotating and zooming the map.

In another aspect, the client device may be used to locate specific items with the geographic space. For example, as shown in FIGS. 1, 23-24, the Position Determination Program of client device 170 may provide the user with a screen 2210 for entering in product names 2230. The device may transmit the search term to server 110, which queries the product location information 140. When a match is found (such as a match to a product's brand name or category), the location of the product may be sent back to Position Determination Program. The Position Determination Program may then display the user's current location 2480 on the map 2410 and the location 2470 of the product on the map. If the server also provides the location of areas that the user can traverse (such as aisles) or not traverse (such as shelving), the Position Determination Program may also calculate and display a recommended path for user to get to the requested product.

Figure 25:
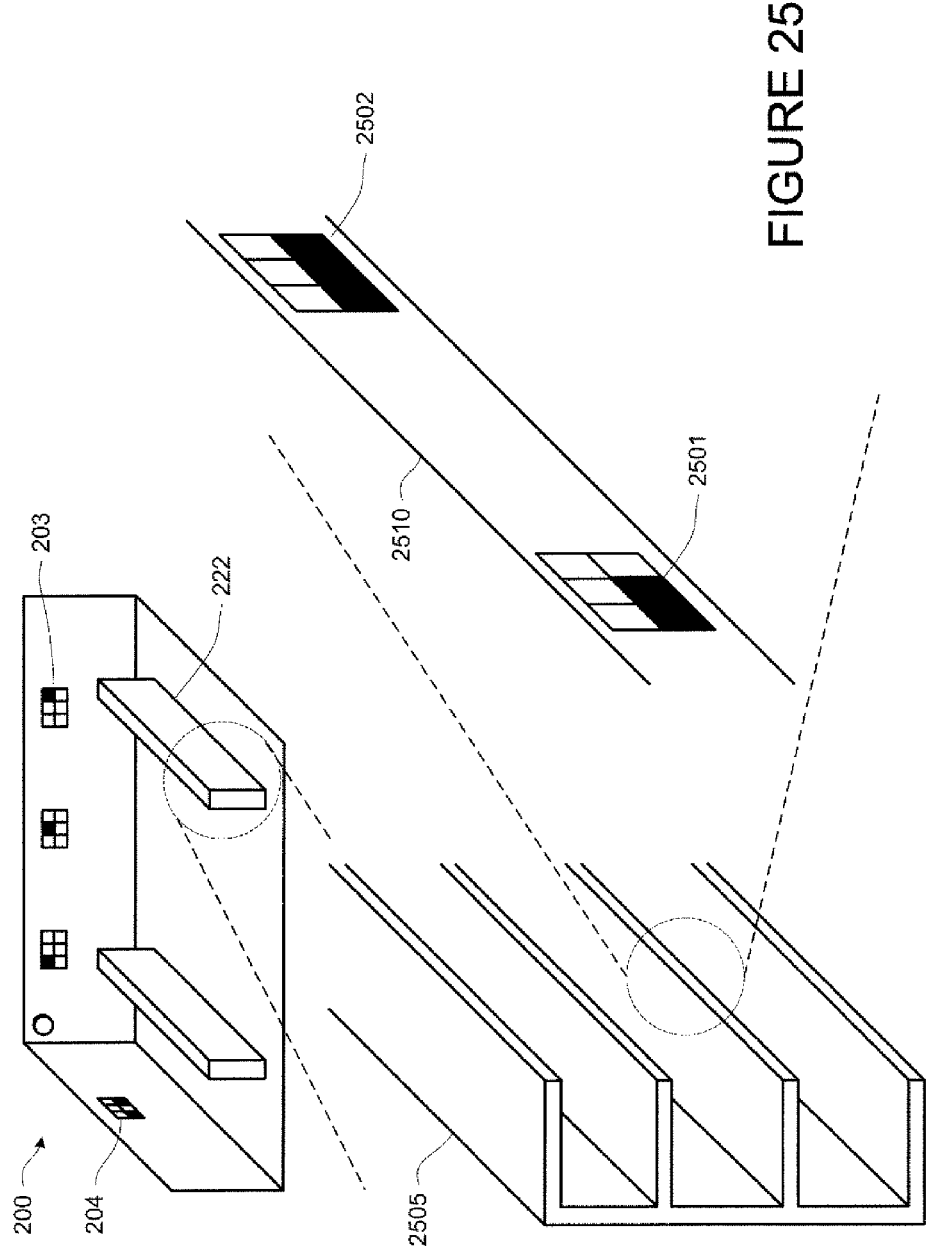
FIG. 25 is a perspective view of a space and different tiers of visual beacons within the space in accordance with an aspect of the system and method.

In still another aspect, the system and method provides different tiers of beacons. For example, as shown in FIG. 25, the interior space 200 may include large visual beacons 203-04 as well as shelves 222. A portion 2505 of the shelves 222 is shown in close up view. A close up view of a portion 2510 of a single shelf 222 is also shown. The front of the shelf may display its own visual beacons 2501-2502, which have a smaller surface area than the visual beacons 201-03 mounted on the walls of the interior space. In such an aspect, the larger global beacons may be used to provide coarse position for the client device while the smaller local beacons may be used to provide finer position and orientation data. When the client device is positioned near and towards the shelves, it may use the smaller visual beacons to determine its position.

In one aspect, the client device will initially detect its position with a first degree of accuracy based on the large beacons (e.g., beacons 201-204, which may be on the ceiling as well), such as when the user first enters a building or is not near objects bearing the smaller beacons. When the client device can accurately identify the smaller beacons, it may use the smaller beacons to determine its position with a higher degree of accuracy. This aspect may be particularly advantageous when used in conjunction with devices that capture relatively low-resolutions images, as they may have the dual problem of not being able to detect small changes in the captured images of the large beacons (such as small changes in position) and not being able to identify the presence of small beacons unless the device is relatively close to the small beacons. In that regard, the different tiers of beacons (e.g., large and distant from each other on the one hand, small and close to each other, on the other hand) may provide different levels of detectability from any location (e.g., easy and hard, respectively) and precision (e.g., course and fine, respectively).

Figure 26:
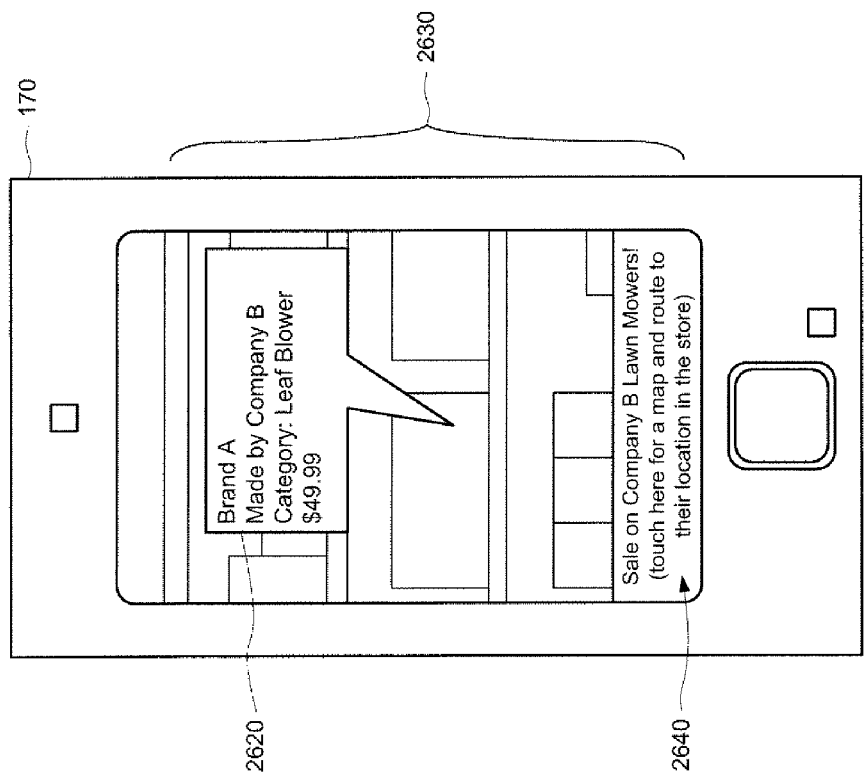
FIG. 26 illustrates a product information screen displayed by a client device in accordance with an aspect of the system and method.

The system and method further may be used to provide information about small and specific items, especially when used in connection with the course and fine tiers of visual beacon described above. As shown in FIG. 26, the client device 170 may be positioned near and oriented towards shelves 2630 containing a variety of products. If the client device 170 transmits its position to the server 110, the server 110 may check the product location database to determine the product at which the device is oriented, and display information 2620 to the client device to be displayed over the captured image. Both the image and information may be updated in real time, e.g., the image captured by the camera is continuously streamed to the display 160, the position of the client device is continuously updated, and changes in position are used to obtain new product information 2620. The client device may also display advertisements 2640 provided by server 110 that are selected based on, yet not specific to, the product at which the camera is pointed. If the advertisements are for other products within the space, the advertisement may offer to navigate the user to the product as described above.

The absolute positions of the visual beacons may be entered into the memory of the server or client device in any number of any number of ways. For example, the distance of the visual beacon may be preset, e.g., the system and method may assume that a 4 foot by 6 foot beacon is be placed every 20 feet along the back wall at a height that is 10 feet from the ground, and starting at a position 20 feet from the left wall. Yet further, server may suggest placement positions for the beacons and the beacons are positioned accordingly.

In another aspect, the beacons are physically placed into their spots and their absolute position subsequently measured. For example, after beacons 201-204 are placed on the walls 211 and 213, their positions may be measured by ruler, range finder or the like and subsequently entered into beacon position information 1780. The positions of other objects, such as shelves 221-22 and the portions they allocate to particular types of products, may be similarly measured and entered.

Figure 27:
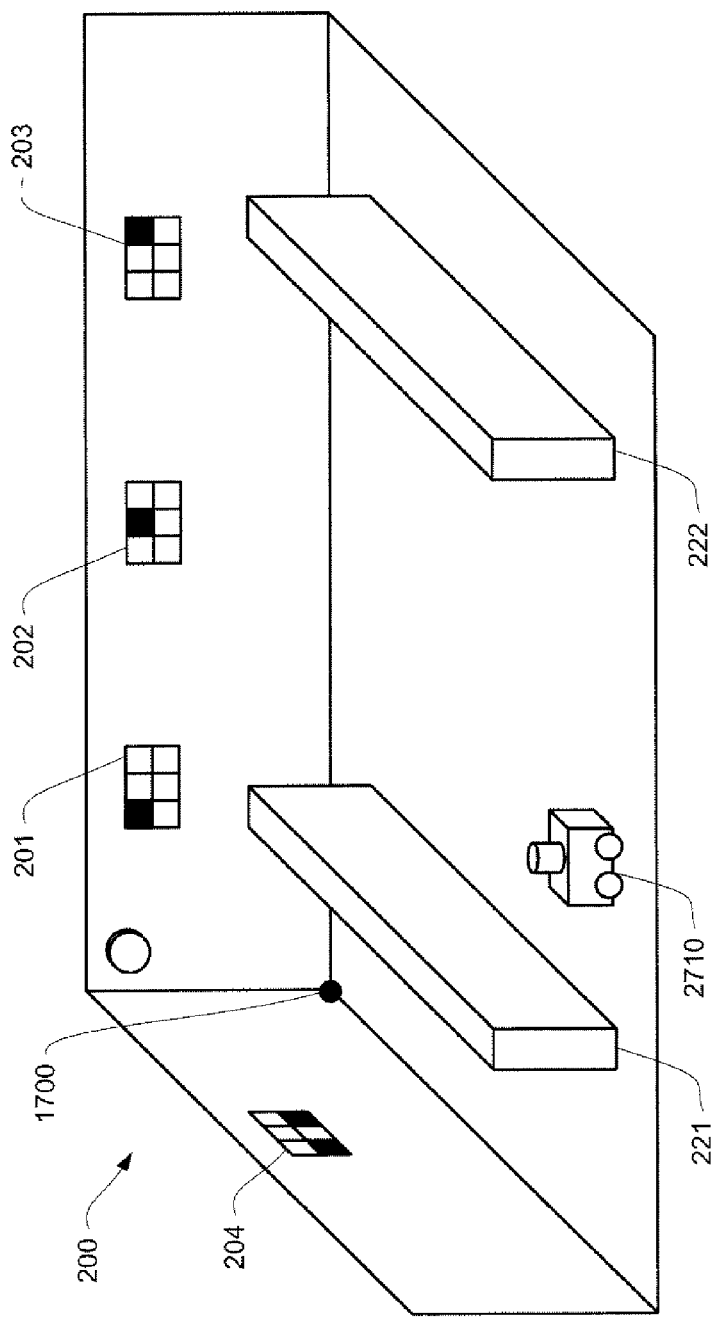
FIG. 27 illustrates a device for determining locations and capturing images within an interior space in accordance with an aspect of the system and method.

FIG. 27 illustrates another system and method for measuring the position of objects within the space 210. Cart 2710 is mobile and may include, by way of example only, a device for determining its absolute position (e.g., laser range finder, odometers on the wheels on the cart, gyroscope and accelerometers, etc.), multiple digital cameras pointing in various directions, and a laptop. As the cart navigates the space, the cameras take images and provide them to the laptop. Special care may be taken to accurately measure the position of the visual beacons 201-04 so that this information may be stored in beacon position information 1780. Each time an image is received, the laptop stores the image along with the absolute position of the cart as by the cart's device. The laptop location-synchronized images 145 are then stored in the server 110.

These pictures may be later analyzed and used to automatically or manually update the product location information 140. By way of example, the server 110 may use OCR to determine the product names that are displayed on the product's boxes and store the product name and the location in the Position Determination Program.

In yet another aspect, the positions of the visual beacons may be manually determined and the images synchronized to their locations by capturing and determining the position of the cart based on the visual beacons.

The location-synchronized images of the objects within the interior space may be also be provided to users. For example, a user may query server 110 with the name of a product and obtain, in response, the latest image of the location that stores the product and text identifying the position of the product within the store (e.g., if the product's position is only stored in terms of distance from a corner of the space, the server may convert the position into an aisle number if the positions of the aisles are known). If the user enters multiple products, the server may not only recommend a path between the products as shown in FIG. 24, but it may also playback the images along the path. Yet further, the server 110 may allow users—whether they are in the store and connected to the server via local wireless network or accessing the server from their home via the Internet—to virtually walk through the store by downloading and displaying the images to the user. By way of example only, a user may virtually walk up and down an aisle by pressing arrow keys, whereby pressing the "up" key changes requests an image a few feet from the currently displayed location and pressing the "left" key requests an image taken from the same location but by a camera pointing in the different direction.

One of the advantages of the system and method is its ability to flexibly accommodate alternative and additional features than those described above.

By way of example only, while the system and method may be particularly advantageous when used in connection with interior spaces which cannot receive GPS satellite signals, the visual beacons may also be used outside. For example, the visual beacons may be stored outside and the client device may be an Internet-capable cell phone that communicates with the server via the Internet.

By way of example only, in lieu of a checkerboard pattern, the system and method may implement any other visual indicia to identify the location of the beacon. For example, the system and method may use barcodes or specially-created symbols. If the beacons' unique ID comprises characters such as letters and numbers, the visual beacon may display the actual characters and the client device may use optical character recognition (OCR) to determine the value of the number. The beacons may also display their absolute positions in lieu of displaying a unique ID, e.g., beacon 201 may comprise a black rectangle surrounding a white background with the black numbers "150; 0; 15; 0; 1; 0; 6; 0; 4" contained inside the rectangle. The beacons may also identify their distances relative to their neighbors, e.g., "2: 20-1; 30-3" may indicate that the current beacon has ID value of "2", it is 20 meters from the beacon having the ID of "1" and 30 meters from the beacon having the ID of "3". The beacons may also have unique 2-D or 3-D shapes or colored. Combinations of the foregoing are also possible. Alternatively, prominent features in the environment may be used to check for matches with the location information with respect to the features.

Yet further, the client device may use relatively common objects to determine its position. By way of example only, if the aisles of a supermarket are numbered with hanging signs of identical size, the signs are visually different if they have the same number (e.g., the signs at opposite ends of the aisle are differently colored), and the absolute positions of the signs are known, the client device may identify its position based on the signs it detects in its field of view.

Figure 28:
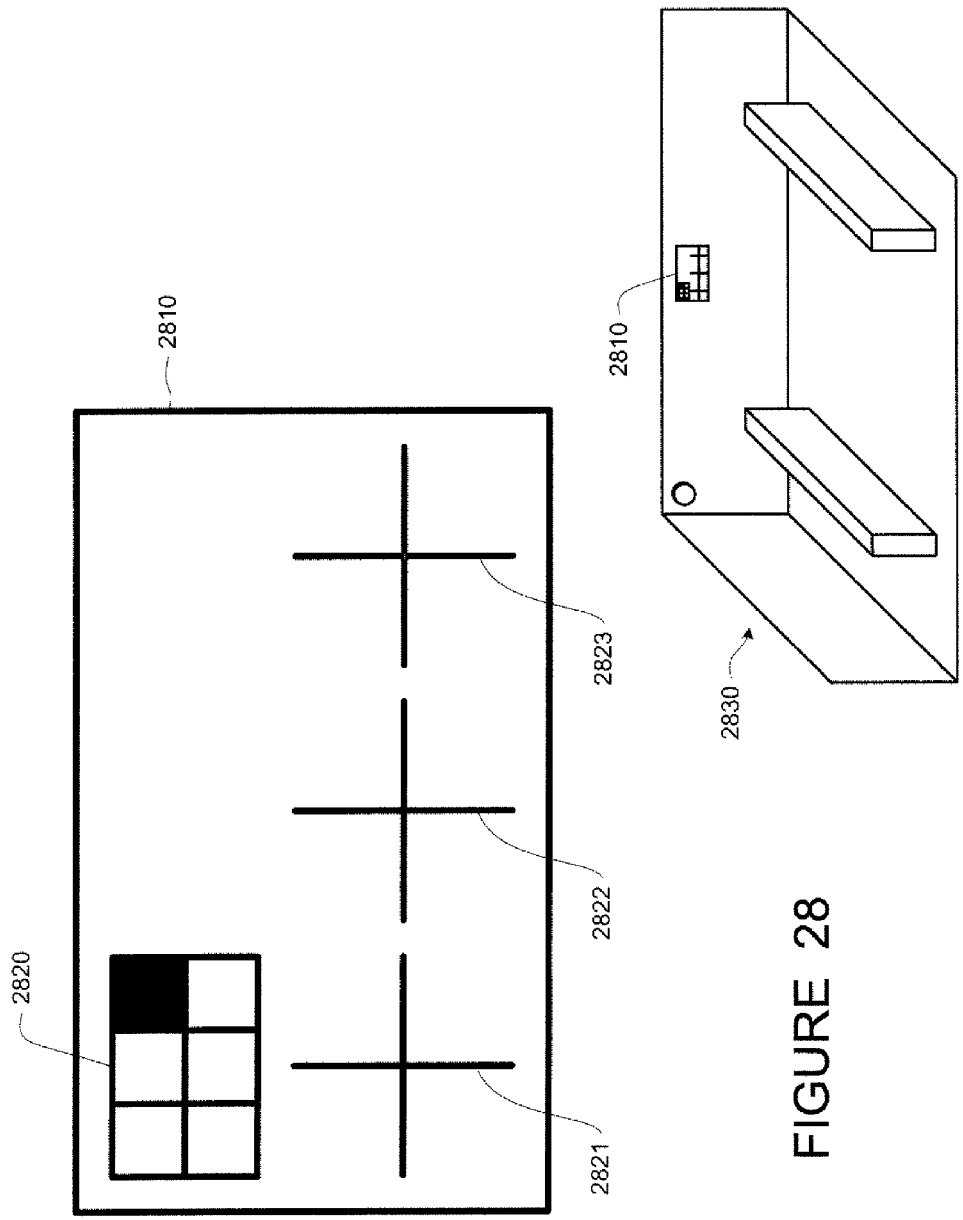
FIG. 28 illustrates a visual beacon, and its location within an interior space, in accordance with an aspect of the system and method.

In another aspect, a single integral unit may perform the function of multiple visual beacons so that a precise position can be determined from the single unit. For example, as shown in FIG. 28, visual beacon 2810 includes visual identifier 2820 that conveys its unique identifier as well as three indicia 2821-23. Provided the absolute position of the three indicia 2821-23 are provided to the client device, and the client device's camera is able to sufficiently determine differences in sizes of the indicia when the image captured, the client device may determine its absolute position within the space 2830.

In yet another aspect, the three-dimensional signatures may be inferred from a given map. For example, features having unique signatures (e.g., two walls that meet in a certain angle) may be recognized using 3D measurements (e.g., from laser data or stereo vision). Recognized unique locations may then be used as a base for determining the device's position and orientation. Moreover, such a system may be combined with the aforementioned image acquisition to provide further data from which even more accurate position/orientation information may be determined. For example, a 3D structure determined by laser data may be matched to the 3D structure expected at this point and confirm or provide additional information relating to localization, including pose.

In other aspects, functions described above as being performed by the server may be performed by the client device, and vice versa. For example, with respect to the beacon position information 1780, the client device may not obtain the entire table but rather determine the beacon's unique ID and receive the beacon's absolute position in response. Yet further, the client device may transmit the entire captured image to the server whereupon the server analyzes the image and performs the necessary calculations and returns a standard web page describing the client device's position and any other information. In yet more aspects, the client device and server perform and share different functions.

Calculating Camera Pose

A description of just one method that may be used to calculate camera pose given matches between known 3D points and their images on the screen follows. The method addresses a restricted case where the camera is assumed to have relatively few degrees of freedom (e.g., potentially one). For the purposes of illustration, a device may move on a plane (one less degree of freedom) and avoids roll. In many instances, the device to be located (e.g., a device appended to a robot or a user's cell phone) may have 3 degrees of freedom (moving on a plane, one degree of freedom for rotation (i.e., no pitch or roll) and two for translation). See Hartley and Zisserman, "Multiple View Geometry in Computer Vision", Cambridge University, 2004, the disclosure of which is hereby incorporated by reference.

The method may accept the following as input:

A. A set of world points given in a world coordinate system. The point X_i is represented by (X_i, Y_i, Z_i, 1)—a 4*1 column vector with its world coordinates B. The images of the given world points: point X_i is imaged onto pixel x_i whose screen coordinates are (x_i, y_i, 1)—a 3*1 column vector (where X and x denote both the vector and the first coordinate).

C. The camera's internal calibration matrix: K a 3*3 matrix

The method may also provide the following as output: A rotation matrix R 3*3 and a translation vector T 3*1 relating the world coordinate system and the camera coordinate system. For a point P (3*1) in the world coordinate system, its coordinates in the camera coordinate system are P_cam=R*P+T.

The relationship between the world point X and its image x may be given by:

$$x=[x\ y\ 1]^t=\text{lambda}*K*[R\ T]*[X\ Y\ Z\ 1]^t=\text{lambda}*K*[R\ T]*X,$$

where lambda is an unknown scale factor. As K is known, it may be inverted to obtain:

$$x\_gal=inv(K)*x=\text{lambda}*[R\ T]*X$$

The right hand side vector [R T]*X (which is a 3*1 vector) may be denoted by U=[u v w]^t.

As the vectors x_gal and U are parallel (they are equal up to an unknown scale factor), their cross product is the 3*1 zero vector:

$$x\_gal\ x\ U=[0, 0, 0]^t \quad \text{(equation 1)};$$

det([i j k; x_gal y_gal 1; u v w])=0.

The variable x_gal is known as it contains the given pixel (x y 1) and the given K. The variable U has both known quantities (the point world coordinates) and unknowns (R and T).

Two equations from equation 1 may be expressed as:

$$w*y\_gal-v=0; \quad \text{(equation 2)}$$

$$w*x\_gal-u=0. \quad \text{(equation 3)}$$

The 3*4 matrix [R T] may be denoted by its rows:

[R T]=[P1; P2; P3]

P1, P2, P3 are its rows—each is a 1*4 vector. The vector U is:

$$U=[u\ v\ w]\ ^t=P*X=[P1;\ P2;\ P3]*X=[X'*P1;\ X'*P2;\ X'*P3]$$

Based on the foregoing equation as well as equation 2 and equation 3, it may be determined that:

$$X'*P3*y\_gal-X'*P2=0$$

$$X'*P3*x\_gal-X'*P1=0$$

P1, P2 and P3 are the unknowns. When stacked in a single 12*1 column vector, the following may be obtained:

$$[0\ 0\ 0\ 0\ -X'y\_gal*X']*[P1';\ P2';\ P3']=0$$

$$[-X'0\ 0\ 0\ x\_gal*X']*[P1';P2';P3']=0$$

In matrix notation, this relates to:

$$A*P=0 \text{ where: } A \text{ is } 2*12 \text{ and } P \text{ is } 12*1 \text{ and } 0 \text{ is } 2*1$$

$$A=[0\ 0\ 0\ 0\ -X'y\_gal*X';\ -X'0\ 0\ 0\ x\_gal*X']$$

The matrix A may be built from a single world point X and its image X_gal and y_gal. The additional correspondence between world points and image pixels gives another two new lines to A. With 6 correspondences, one may obtain A 12*12 which suffices for determining the unknown vector P 12*1.

A linear algorithm for a general camera matrix P may include, in summary:

A. Build the matrix A from the correspondences;

B. Solve A*P=0 for the 12*1 vector P. If not in a degenerate configuration of world points, A is expected to have a single-dimensional kernel which can be thus recovered.

3. P is the Camera Matrix (Up to Scale)

In a restricted case without 6 degrees of freedom motion, it may not be necessary to obtain 6 correspondences between the surrounding environment and captured image. One method relating to restricted case includes:

A. Parameterize the search space by choosing a parameterization for the rotations and translations.

B. If the parameters are put in a vector called Theta, the P matrix for every value of Theta may be written as:

$$P=P(\text{Theta})$$

For example, in a restricted camera with only a single rotational degree of freedom, the equations include:

Theta=[alpha Tx Ty Tz]

$$P(\text{Theta})=[\cos(\text{alpha})\ 0\ \sin(\text{alpha})\ Tx;\ 0\ 1\ 0\ Ty;-\sin(\text{alpha})\ 0\ \cos(\text{alpha})\ Tz]$$

C. Optimization includes minimizing over Theta the objective function J(Theta)=sum over correspondences (X_i vs x_i) of d(x_i, P(Theta)*X_i)^2

Thus, for every world point X_i, it may be projected to the screen with P(Theta) and determined how far it falls from the corresponding pixel x_i. The Theta values that bring these discrepancies to a minimum are then found.

D. The foregoing description of the linear algorithm above may often be used as the starting point for iterative minimization of the above objective function.

As these and other variations and combinations of the features discussed above can be utilized without departing from the invention as defined by the claims, the foregoing description of the embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:

1. A method of determining a location of a camera within an interior space comprising:

receiving, by one or more processors, a first image captured by the camera;

identifying, by the one or more processors, two different portions of the first image associated with a first object and a second object within the space, wherein the first object defines a first contiguous surface extending to a first edge and the second object defines a second contiguous surface extending to a second edge, and wherein the portions are identified by comparing visual characteristics of the portions with visual characteristics known to be associated with each of the first and second objects;

identifying, by the one or more processors, based on visual information contained within the portions of the first image displaying the first and second objects, a distance between the first edge of the first object and the second edge of the second object;

determining, by the one or more processors, a first location of the camera based on a comparison of the sizes and shapes of the portions of the first image associated with the first and second objects and the distance between the first edge of the first object and the second edge of the second object;

providing, by the one or more processors, information based on the first location of the camera;

receiving, by the one or more processors, a second image captured by the camera, the second image having at least one portion associated with at least one object, wherein the at least one object is smaller in size than the first and second objects;

determining, by the one or more processors, a second location of the camera based at least on visual information contained within the at least one portion, the second location being more precise than the first location; and providing, by the one or more processors, information based on the second location of the camera.

2. The method of claim 1, wherein the visual information contained within the portions of the image displaying the first and second objects comprises visual information that distinguishes the first object from the second object.

3. The method of claim 1, wherein the visual information comprises a unique identifier for each of the first and second object, and wherein identifying the distance between the first edge of the first object and the second edge of the second object comprises accessing distance information associated with the identifiers.

4. The method of claim 2, wherein accessing distance information comprises accessing locations of the first object and the second object within the space based on the identifiers, and calculating the distance between the first edge of the first object and the second edge of the second object based on the accessed locations.

5. The method of claim 1, wherein the first edge of the first object and the second edge of the second object are opposing edges.

6. The method of claim 1, wherein the determined first location of the camera is further based on a visual angle between the first edge and the second edge.

7. The method of claim 1, wherein the provided information includes a location of the camera on a map relative to the first object and the second object.

8. An apparatus for determining a location of a camera within an interior space comprising:
one or more processors; and
a non-transitory computer-readable medium storing computer-executable instructions that, when executed by the one or more processors, cause the one or more processors to perform the steps of:
receiving an image captured by the camera;
identifying two different portions of the image associated with a first object and a second object within the space, wherein the first object defines a first contiguous surface extending to a first edge and the second object defines a second contiguous surface extending to a second edge, and wherein the portions are identified by comparing visual characteristics of the portions with visual characteristics known to be associated with each of the first and second objects;

identifying, based on visual information contained within the portions of the image displaying the first and second objects, a distance between the first edge of the first object and the second edge of the second object;

determining a first location of the camera based on a comparison of the sizes and shapes of the portions of the image associated with the first and second objects and the distance between the first edge of the first object and the second edge of the second object;

providing information based on the first location of the camera;

receiving a second image captured by the camera, the second image having at least one portion associated with at least one object, wherein the at least one object is smaller in size than the first and second objects;

determining a second location of the camera based at least on visual information contained within the at least one portion; and providing information based on the second location of the camera.

9. The apparatus of claim 8, wherein the visual information contained within the portions of the image displaying the first and second objects comprises visual information that distinguishes the first object from the second object.

10. The apparatus of claim 9, wherein the visual information comprises a unique identifier for each of the first and second object, and wherein identifying the distance between the first edge of the first object and the second edge of the second object comprises accessing distance information associated with the identifiers.

11. The apparatus of claim 10, wherein accessing distance information comprises accessing locations of the first object and the second object within the space based on the identifiers, and calculating the distance between the first edge of the first object and the second edge of the second object based on the accessed locations.

12. The apparatus of claim 8, wherein the first edge of the first object and the second edge of the second object are opposing edges.

13. The apparatus of claim 8, wherein the determined first location of the camera is further based on a visual angle between the first edge and the second edge.

14. The apparatus of claim 8,
wherein the provided information includes a location of the camera on a map relative to the first object and the second object.

15. A non-transitory, computer-readable medium storing computer-executable instructions that, when executed by one or more processors, cause the one or more processors to perform a method, the method comprising:
receiving, by the one or more processors, an image captured by a camera;
identifying, by the one or more processors, two different portions of the image associated with a first object and a second object within an interior space, wherein the first object defines a first contiguous surface extending to a first edge and the second object defines a second contiguous surface extending to a second edge, and wherein the portions are identified by comparing visual characteristics of the portions with visual characteristics known to be associated with each of the first and second objects;

identifying, by the one or more processors, based on visual information contained within the portions of the image displaying the first and second objects, a distance between the first edge of the first object and the second edge of the second object;

determining, by the one or more processors, a first location of the camera based on a comparison of the sizes and shapes of the portion of the image associated with the first and second objects and the distance between the first edge of the first object and the second edge of the second object;

providing, by the one or more processors, information based on the first location of the camera;

receiving, by the one or more processors, a second image captured by the camera, the second image having at least one portion associated with at least one object, wherein the at least one object is smaller in size than the first and second objects;

determining, by the one or more processors, a second location of the camera based at least on visual information contained within the at least one portion; and providing, by the one or more processors, information based on the second location of the camera.

16. The non-transitory, computer-readable medium of claim 15, wherein the visual information contained within the portions of the image displaying the first and second objects comprises visual information that distinguishes the first object from the second object.

17. The non-transitory, computer-readable medium of claim 16, wherein the visual information comprises a unique identifier for each of the first and second object, and wherein identifying the distance between the first edge of the first object and the second edge of the second object comprises accessing distance information associated with the identifiers.

18. The non-transitory, computer-readable medium of claim 17, wherein accessing distance information comprises accessing locations of the first object and the second object within the space based on the identifiers, and calculating the distance between the first edge of the first object and the second edge of the second object based on the accessed locations.

19. The non-transitory, computer-readable medium of claim 15, wherein the first edge of the first object and the second edge of the second object are opposing edges.

20. The non-transitory, computer-readable medium of claim 15, wherein the determined first location of the camera is further based on a visual angle between the first edge and the second edge.

* * * * *